USO11057856B2

(12) United States Patent
Hoshino

(10) Patent No.: US 11,057,856 B2
(45) Date of Patent: Jul. 6, 2021

(54) SITE-TO-SITE TRANSMISSION/PROPAGATION DELAY CORRECTION DURING APPLICATION OF SITE DIVERSITY IN HAPS FEEDER LINK

(71) Applicant: SoftBank Corp., Tokyo (JP)

(72) Inventor: Kenji Hoshino, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 16/959,689

(22) PCT Filed: Dec. 21, 2018

(86) PCT No.: PCT/JP2018/047258
§ 371 (c)(1),
(2) Date: Jul. 2, 2020

(87) PCT Pub. No.: WO2019/135369
PCT Pub. Date: Jul. 11, 2019

(65) Prior Publication Data
US 2020/0383078 A1  Dec. 3, 2020

(30) Foreign Application Priority Data

Jan. 4, 2018  (JP) .............................. JP2018-000311

(51) Int. Cl.
*H04W 56/00* (2009.01)
*H04B 7/185* (2006.01)
*H04W 64/00* (2009.01)

(52) U.S. Cl.
CPC .... *H04W 56/0045* (2013.01); *H04B 7/18504* (2013.01); *H04W 56/006* (2013.01); *H04W 56/0065* (2013.01); *H04W 64/003* (2013.01)

(58) Field of Classification Search
CPC ........... H04W 56/004; H04W 56/0045; H04W 56/005; H04W 56/0055; H04W 56/006;
(Continued)

(56) References Cited

U.S. PATENT DOCUMENTS 8,274,947 B1 * 9/2012 Fang ..................... H04W 56/00
370/331
9,083,425 B1 * 7/2015 Frolov ................... G05D 1/104
(Continued)

FOREIGN PATENT DOCUMENTS

| CA | 2 981 855 | 12/2016 |
|---|---|---|
| CN | 1311610 A | 9/2001 |

(Continued)

*Primary Examiner* — Kevin D Mew
(74) *Attorney, Agent, or Firm* — Muirhead and Saturnelli, LLC

(57) ABSTRACT

A communication system, in which a sufficient reception power can be obtained without being affected by attenuation such as rainfall in each of a radio relay apparatus and a gateway station, is provided. The communication system performs a communication via a radio relay apparatus located in an upper airspace. A plurality of gateway stations for forming feeder-link radio sections between the own gateway stations and the radio relay apparatus are disposed at a plurality of locations geographically separated from each other on the ground or on the sea. The plurality of gateway stations perform simultaneous transmissions/receptions of signals via the plurality of feeder links or transmissions/receptions of signals accompanied by a switching of the feeder links, with the radio relay apparatus.

28 Claims, 18 Drawing Sheets

(58) Field of Classification Search
CPC ............... H04W 56/0065; H04W 64/003; H04B 7/185; H04B 7/18502; H04B 7/18504; H04B 7/18506
See application file for complete search history.

(56) References Cited

U.S. PATENT DOCUMENTS

| | | | |
|---|---|---|---|
| 10,785,738 B2 | 9/2020 | Shiobara et al. | |
| 2001/0040902 A1 | 11/2001 | Rao | |
| 2003/0093187 A1* | 5/2003 | Walker | B64D 45/0059 701/1 |
| 2007/0042772 A1* | 2/2007 | Salkini | G01S 5/02 455/431 |
| 2011/0231862 A1* | 9/2011 | Walsh | G06F 9/5061 719/318 |
| 2016/0046387 A1* | 2/2016 | Frolov | B64B 1/00 244/59 |
| 2016/0050012 A1* | 2/2016 | Frolov | H04B 7/18506 455/431 |
| 2016/0370800 A1* | 12/2016 | Chau | G05D 1/0088 |
| 2019/0289561 A1* | 9/2019 | Corley | H04W 24/02 |
| 2020/0119805 A1* | 4/2020 | Miyakawa | B64F 1/00 |
| 2020/0314698 A1* | 10/2020 | Tang | H04W 24/10 |
| 2020/0380874 A1* | 12/2020 | Fujii | G08G 5/0043 |

FOREIGN PATENT DOCUMENTS

| | | |
|---|---|---|
| JP | 2000-13850 A | 1/2000 |
| JP | 2005-295096 A | 10/2005 |
| JP | 2009-225137 A | 10/2009 |
| JP | 2017-157917 A | 9/2017 |
| WO | WO 00/79705 A1 | 12/2000 |
| WO | WO 2016/175460 A1 | 11/2016 |
| WO | WO 2016/179037 A1 | 11/2016 |

* cited by examiner

SITE-TO-SITE TRANSMISSION/PROPAGATION DELAY CORRECTION DURING APPLICATION OF SITE DIVERSITY IN HAPS FEEDER LINK

TECHNICAL FIELD

The present invention relates to a base station, a radio relay apparatus, a gateway station and a communication system.

BACKGROUND ART

There is conventionally known of a communication system for performing a communication between a terrestrial gateway (GW) station and a terminal apparatus via a radio relay apparatus located in an upper airspace. For example, in Patent Literature 1, a communication system for performing a communication between a base station (GW station) and a terminal station (terminal apparatus) via an out-satellite (radio relay apparatus) or an in-satellite (radio relay apparatus) that comes next is disclosed.

CITATION LIST

Patent Literature

Patent Literature 1: Japanese Unexamined Patent Application Publication No. 2005-295096.

SUMMARY OF INVENTION

Technical Problem

In the foregoing feeder link between the radio relay apparatus located in an upper airspace of the communication system and the terrestrial base station, there is a problem that a sufficient received power may not be obtained due to an influence of attenuation by clouds or rainfall of the upper airspace. In particular, in a feeder link using a high frequency band such as several GHz band to several tens GHz band, the influence of the attenuation is large, and a received power is easy to decrease.

Solution to Problem

A communication system according to an aspect of the present invention is a communication system for performing a communication via a radio relay apparatus located in an upper airspace, a plurality of gateway stations for forming radio sections of a plurality of feeder links with the radio relay apparatus are disposed at a plurality of locations geographically separated from each other on the ground or on the sea, and the plurality of gateway stations perform simultaneous transmissions/receptions of signals via the plurality of feeder links or transmissions/receptions of signals accompanied by a switching of the feeder links, with the radio relay apparatus. In the foregoing communication system, each of the plurality of gateway stations, in a forward link for transmitting a signal from the gateway station to the radio relay apparatus, may shift a transmission timing of the signal by an offset that is set in accordance with a propagation delay time between the gateway station and the radio relay apparatus. Herein, the gateway station or the radio relay apparatus may include a function of a base station function.

In the foregoing communication system, the communication system may comprise a base station connected to the plurality of gateway stations, and the base station, in each of the plurality of forward links for transmitting a signal to the radio relay apparatus via the plurality of gateway stations, may shift a transmission timing of the signal by an offset that is set in accordance with a transmission delay time between the base station and the gateway station.

Herein, each of the plurality of gateway stations, in each of the plurality of forward links, may shift a transmission timing of the signal by an offset that is set in accordance with a transmission delay time between the base station and the gateway station and a propagation delay time between the gateway station and the radio relay apparatus.

The base station, in each of the plurality of forward links, may shift a transmission timing of the signal by an offset that is set in accordance with a transmission delay time between the base station and the gateway station and a propagation delay time between the gateway station and the radio relay apparatus.

Further, each of the plurality of gateway stations, in each of the plurality of forward links, may shift a transmission timing of the signal by an offset that is set in accordance with a propagation delay time between the gateway station and the radio relay apparatus, and the base station, in each of the plurality of forward links, may shift a transmission timing of the signal by an offset that is set in accordance with a transmission delay time between the base station and the gateway station.

In the foregoing communication system, each of the plurality of gateway stations, in each of a plurality of reverse links for receiving a signal from the radio relay apparatus, may shift a reception timing of the signal by an offset that is set in accordance with a propagation delay time between the gateway station and the radio relay apparatus.

In the foregoing communication system, the base station, in each of the plurality of reverse links, may shift a reception timing of the signal by an offset that is set in accordance with a transmission delay time between the base station connected to the gateway station and the gateway station.

In the foregoing communication system, the base station, in each of the plurality of reverse links, may shift a reception timing of the signal by an offset that is set in accordance with a transmission delay time between the gateway station and the base station and a propagation delay time between the gateway station and the radio relay apparatus.

In the foregoing communication system, each of the plurality of gateway stations, in each of the plurality of reverse links, may shift a reception timing of the signal by an offset that is set in accordance with a transmission delay time between the gateway station and the base station and a propagation delay time between the gateway station and the radio relay apparatus.

In the foregoing communication system, each of the plurality of gateway stations, in each of the plurality of reverse links, may shift a reception timing of the signal by an offset that is set in accordance with a propagation delay time between the gateway station and the radio relay apparatus, and the base station, in each of the plurality of reverse links, may shift a reception timing of the signal by an offset that is set in accordance with a transmission delay time between the gateway station and the base station.

In the foregoing communication system, the offset may be set based on at least one of a distance between the gateway station and the base station and a distance between the gateway station and the radio relay apparatus.

A gateway station according to another aspect of the present invention is any one of a plurality of gateway stations disposed at a plurality of locations geographically separated from each other on the ground or on the sea so as to form a radio section of a feeder link with a radio relay apparatus located in an upper airspace, performs simultaneous transmissions/receptions of signals in cooperation with other gateway stations other than its own among the plurality of gateway stations, or transmissions/receptions of signals accompanied by a switching with the other gateway stations, with the radio relay apparatus.

In the foregoing gateway station, in a forward link for transmitting a signal to the radio relay apparatus or a reverse link for receiving a signal from the radio relay apparatus, a transmission timing of the signal of the forward link or a reception timing of the signal of the reverse link may be shifted by an offset that is set in accordance with a propagation delay time between the own station and the radio relay apparatus.

In the foregoing gateway station, in a forward link for transmitting a signal to the radio relay apparatus or a reverse link for receiving a signal from the radio relay apparatus, a transmission timing of the signal of the forward link or a reception timing of the signal of the reverse link may be shifted by an offset that is set in accordance with a transmission delay time between the own station and the base station and a propagation delay time between the own station and the radio relay apparatus.

A base station according to still another aspect of the present invention is connected to a plurality of gateway stations disposed at a plurality of locations geographically separated from each other on the ground or on the sea so as to form a radio section of a plurality of feeder links with a radio relay apparatus located in an upper airspace, and the base station performs simultaneous transmissions/receptions of signals via the plurality of feeder links or transmissions/receptions of signals accompanied by a switching of the feeder links, with the radio relay apparatus.

In the foregoing base station, in each of a plurality of forward links for transmitting signals to the radio relay apparatus via the plurality of gateway stations or each of a plurality of reverse links for receiving signals from the radio relay apparatus via the plurality of gateway stations, a transmission timing of the signal of the forward link or a reception timing of the signal of the reverse link may be shifted by an offset that is set in accordance with a transmission delay time between the gateway station and the base station.

In the foregoing base station, in each of the plurality of forward links or each of the plurality of reverse links, a transmission timing of the signal of the forward link or a reception timing of the signal of the reverse link may be shifted by an offset that is set in accordance with a transmission delay time between the base station apparatus and the gateway station and a propagation delay time between the gateway station and the radio relay apparatus.

In the foregoing gateway station and base station, the offset may be set based on at least one of a distance between the gateway station and the base station and a distance between the gateway station and the radio relay apparatus.

A radio relay apparatus according to still another aspect of the present invention is a radio relay apparatus located in an upper airspace, forms a plurality of feeder links between a plurality of gateway stations disposed at a plurality of locations geographically separated from each other on the ground or on the sea, and performs simultaneous transmissions/receptions of signals via the plurality of feeder links or transmissions/receptions of signals accompanied by a switching of the feeder links, with the plurality of gateway stations.

Advantageous Effects of Invention

According to the present invention, when any one of a plurality of feeder links formed between a radio relay apparatus in an upper airspace and a plurality of gateway stations is affected by attenuation such as rainfall, a communication between the radio relay apparatus and the gateway station can be performed via another feeder link that is not affected by attenuation such as rainfall, and a sufficient reception power can be obtained in each of the radio relay apparatus and the gateway station. Therefore, there is an effect that a sufficient reception power can be obtained without being affected by attenuation such as rainfall in each of the radio relay apparatus and the gateway station.

DESCRIPTION OF EMBODIMENTS

Hereinafter, embodiments of the present invention will be described with reference to the drawings.

Figure 1:
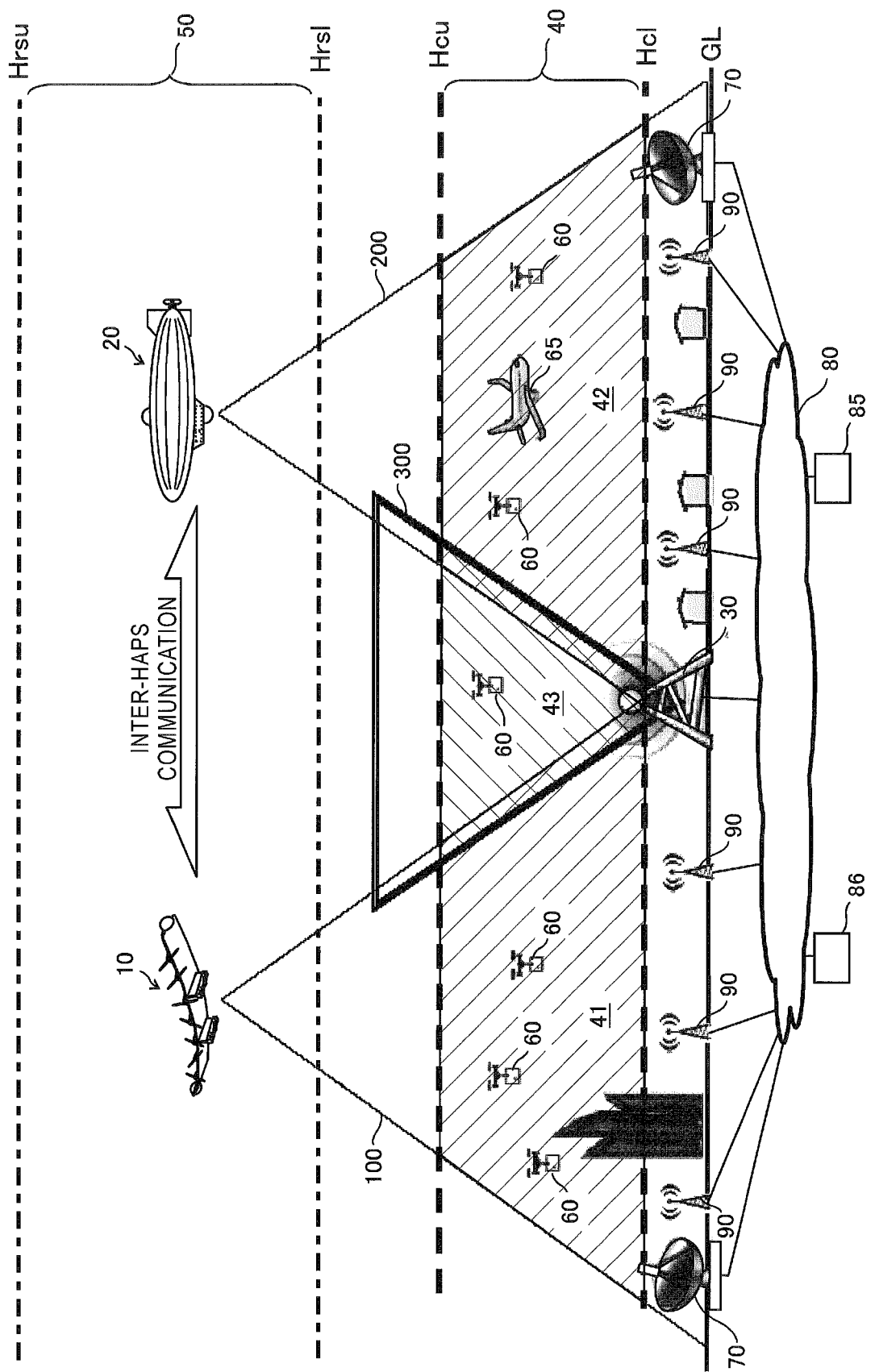
FIG. 1 is a schematic configuration diagram showing an example of an overall configuration of a communication system for realizing a three-dimensional network according to an embodiment of the present invention.

FIG. 1 is a schematic configuration diagram showing an example of an overall configuration of a communication system according to an embodiment of the present invention.

The communication system according to the present embodiment is suitable for realizing a three-dimensional network of the fifth generation mobile communication corresponding to a simultaneous connection to a large number of terminal apparatus, low delay method, etc. Further, the mobile communication standard applicable to a communication system, a radio relay station, a base station, a repeater, and a terminal apparatus disclosed in the present description, includes a fifth generation mobile communication standard and next generation mobile communication standards after the fifth generation.

As shown in FIG. 1, a communication system is provided with a plurality of High Altitude Platform Stations (HAPS) (also referred to as "High Altitude Pseudo Satellite") 10 and 20 as multiple communication relay apparatuses of an aerial floatage type (radio relay apparatus). The HAPSs 10 and 20 are located in an airspace at a predetermined altitude, and form three-dimensional cells (three-dimensional areas) 41 and 42 as indicated by hatching areas in the figure in a cell-formation target airspace 40 at a predetermined altitude. Each of the HAPSs 10 and 20 is a floating object (for example, solar plane, airship) including a radio relay station mounted therein, which is controlled to be floated or flied and located in an airspace (floating airspace) 50 with high altitude of 100 [km] or less from the ground level or the sea level by an autonomous control or an external control.

The airspace 50 in which the HAPSs 10 and 20 are located is, for example, a stratospheric airspace with altitude greater than 11 [km] and less than 50 [km]. The airspace 50 may be an airspace with altitude greater than 15 [km] and less than 25 [km] where weather conditions are relatively stable, and may be an airspace with altitude of about 20 [km] in particular. Each of Hrsl and Hrsu in the figure indicates relative altitudes of the lower end and the upper end of the airspace 50 with reference to the ground level (GL), in which the HAPSs 10 and 20 are located.

The cell-formation target airspace 40 is a target airspace for forming a three-dimensional cell with one or two or more HAPSs according to the communication system of the present embodiment. The cell-formation target airspace 40 is an airspace in a predetermined altitude range (for example, altitude range of 50 [m] or more and 1000 [m] or less) located between the airspace 50 where the HAPSs 10 and 20 are located and a cell-formation area near the ground level covered by a base station (for example, LTE eNodeB) 90 such as a conventional macro-cell base station. Each of Hcl and Hcu in the figure indicates relative altitudes of the lower end and the upper end of the cell-formation target airspace 40 with reference to the ground level (GL).

It is noted that, the cell-formation target airspace 40 where the three-dimensional cell of the present embodiment is formed may be an airspace over the sea, a river, or a lake.

The radio relay stations of the HAPSs 10 and 20 respectively forms beams 100 and 200 for a radio communication with the terminal apparatus that is a mobile station, toward the ground level. The terminal apparatus may be a communication terminal module incorporated in a drone 60 that is an aircraft such as a small helicopter capable of remotely steering, or may be a user apparatus used by a user in the airplane 65. The areas through which the beams 100 and 200 pass in the cell-formation target airspace 40 are three-dimensional cells 41 and 42. The plurality of beams 100 and 200 adjacent to each other in the cell-formation target airspace 40 may be partially overlapped with each other.

Each of the radio relay stations of the HAPSs 10 and 20 is, for example, a base station that communicates wirelessly with a gateway station (also referred to as a "feeder station") 70 as a relay station connected to a core network on the ground (or on the sea), or a slave repeater that communicates wirelessly with a feeder station (master repeater) 70 as a relay station connected to a base station on the ground (or on the sea). Each of the radio relay stations of the HAPSs 10 and 20 is connected to the core network of the mobile communication network 80 via the feeder station 70 installed on the ground or on the sea. The communication between the HAPSs 10 and 20 and the feeder station 70 may be performed by a radio communication using radio waves such as microwaves, or may be performed by an optical communication using laser light or the like.

Each of the HAPSs 10 and 20 may autonomously control its own floating movement (flight) or a processing at the radio relay station, by executing a control program with a control section including a computer or the like incorporated in the inside of the HAPS. For example, each of the HAPSs 10 and 20 may acquire its own current position information (for example, GPS position information), position control information (for example, flight schedule information) stored in advance, and position information on another HAPS located in a peripheral space, etc., and autonomously control the floating movement (flight) and the processing in the radio relay station based on these information.

The floating movement (flight) of each HAPS 10 and 20 and the processing in the radio relay stations may be controlled by a remote control apparatus 85 such as a management apparatus, which is disposed in a communication center or the like of the mobile communication network 80. In this case, the HAPSs 10 and 20 may include a communication terminal apparatus for control (for example, a mobile communication module) so that control information from the remote control apparatus 85 can be received and various information can be transmitted to the remote control apparatus 85, and terminal identification information (for example, IP address, telephone number, etc.) may be allocated to the terminal communication apparatus so as to be identified from the remote control apparatus 85. The MAC address of the communication interface may be used for identifying the communication terminal apparatus for control. Each of the HAPSs 10 and 20 may transmit information relating to the floating movement (flight) of the HAPS itself or the surrounding HAPS and the processing at the radio relay station and information such as observation data acquired by various sensors to a predetermined destination such as the remote control apparatus 85.

In the cell-formation target airspace 40, there is a possibility that a spatial area where the beams 100 and 200 of the HAPSs 10 and 20 do not pass may occur, in which the three-dimensional cells 41 and 42 are not formed. In order to spatially complement this area, as shown in the configuration example in FIG. 1, a base station (hereinafter referred to as "ATG station") 30 may be disposed, which forms a three-dimensional cell 43 by forming a radial beam 300 from the ground or the sea side upward to make an ATG (Air To Ground) connection.

By adjusting the positions of the HAPSs 10 and 20 and the divergence angle (beam width) etc. of the beams 100 and 200 without using the ATG station 30, the radio relay stations of the HAPSs 10 and 20 may form the beams 100 and 200 covering the overall upper end face of the cell-formation target airspace 40 so that three-dimensional cells are formed all over the cell-formation target airspace 40.

It is noted that, the three-dimensional cell formed by the HAPSs 10 and 20 may be formed so as to reach the ground level or the sea level so as to be able to communicate also with the terminal apparatus located on the ground or on the sea.

Figure 2:
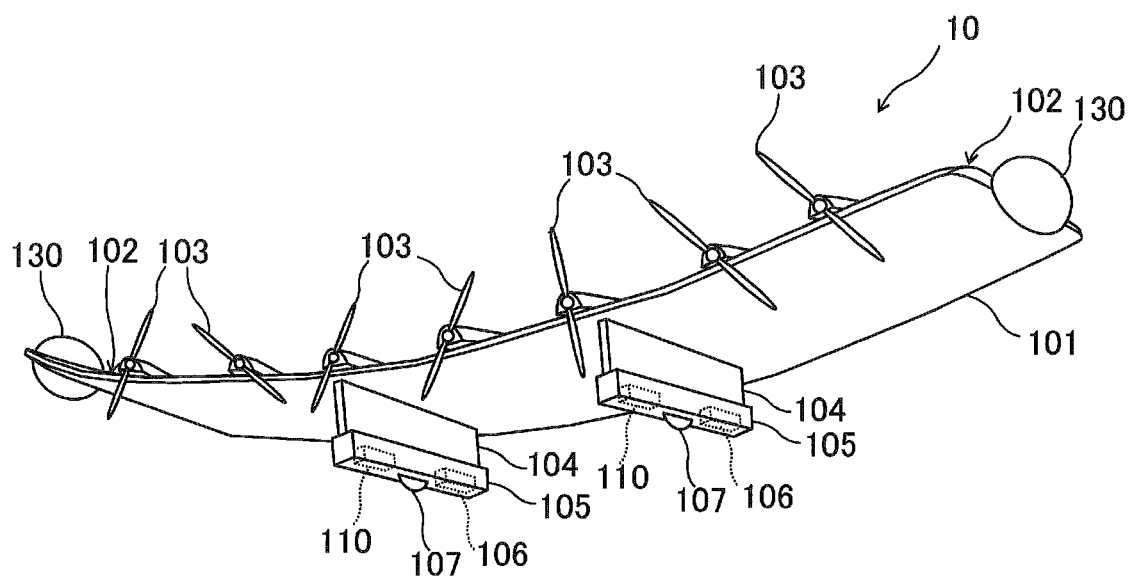
FIG. 2 is a perspective view showing an example of HAPS used in a communication system in the embodiment.

FIG. 2 is a perspective view showing an example of the HAPS 10 used in the communication system in the embodiment.

The HAPS 10 in FIG. 2 is a solar plane-type HAPS, and has a main wing section 101 in which both end portions in the longitudinal direction are warped upward, and a plurality of motor-driven propellers 103 as a propulsion apparatus of a bus-motive power system provided at one end edge portion of the main wing section 101 in the lateral direction. A solar power generation panel (hereinafter referred to as "solar panel") 102 as a photovoltaic power generation section having a photovoltaic power generation function is provided on the upper surface of the main wing section 101. Pods 105 as a plurality of apparatus accommodating sections for accommodating the mission equipment are connected to the two positions in the longitudinal direction of the lower surface of the main wing section 101 via a plate-like connecting section 104. Inside each pod 105, a radio relay station 110 as a mission equipment and a battery 106 are accommodated. On the lower surface side of each pod 105, wheels 107 used on departure and arrival are provided. The electric power generated by the solar panel 102 is stored in the battery 106, the motor of the propeller 103 is rotationally driven by the electric power supplied from the battery 106, and the radio relay processing by the radio relay station 110 is executed.

The solar plane-type HAPS 10 can float with lift force by, for example, performing a turning flight or performing a flight along a figure of "8", and can float to stay in a predetermined range in the horizontal direction at a predetermined altitude. It is noted that, the solar plane-type HAPS 10 can also fly like a glider when the propeller 103 is not rotationally driven. For example, when electric power of the battery 106 is surplus by power generation of the solar panel 102, such as in daytime, the solar plane-type HAPS 10 rises up to a high position, and when an electric power cannot be generated by the solar panel 102 such as at night, the solar plane-type HAPS 10 can stop power supply from the battery 106 to the motor and fly like a glider.

The HAPS 10 has an optical antenna apparatus 130 of the directivity for three dimensions as a communication section used for an optical communication with another HAPS and an artificial satellite. In the example of FIG. 2, although the optical antenna apparatus 130 is disposed at both ends of the main wing section 101 in the longitudinal direction, the optical antenna apparatus 130 may be disposed at another location of the HAPS 10. It is noted that the communication section used for optical communications with other HAPS and artificial satellites is not limited to such optical communication, and may be radio communications by other methods such as a radio communication using radio waves such as microwaves.

Figure 3:
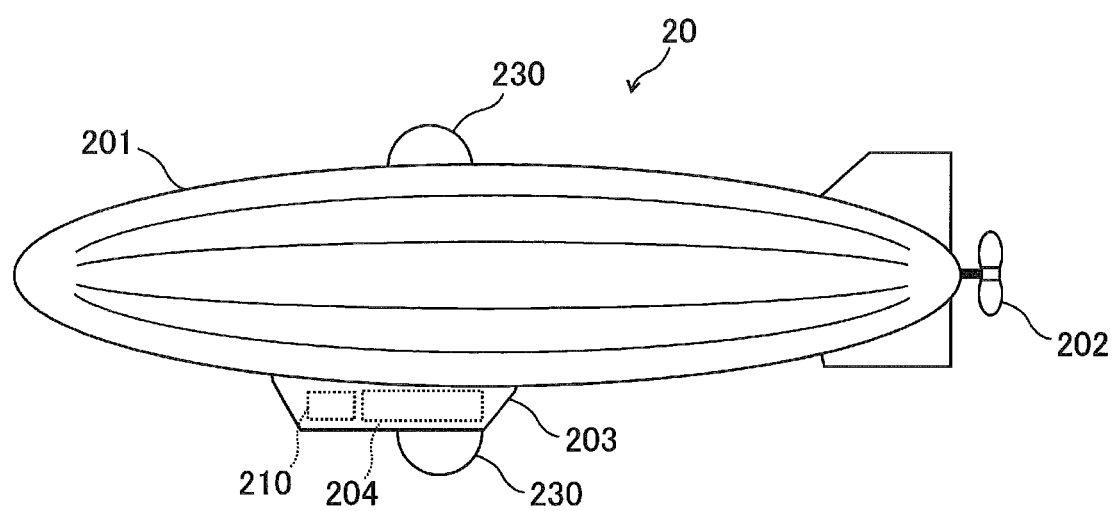
FIG. 3 is a side view showing another example of HAPS used in a communication system in the embodiment.

FIG. 3 is a side view showing another example of the HAPS 20 used in a communication system in the embodiment.

The HAPS 20 in FIG. 3 is an unmanned airship-type HAPS, and can mount a large capacity battery since the payload is large. The HAPS 20 has an airship body 201 filled with gas such as helium gas for floating by floating power, a propeller 202 driven by a motor as a propulsion apparatus of a bus-motive power system, and an equipment accommodating section 203 in which mission equipment is accommodated. A radio relay station 210 and a battery 204 are accommodated in the equipment accommodating section 203. A motor of the propeller 202 is rotationally driven by an electric power supplied from the battery 204, and a radio relay processing by the radio relay station 210 is executed.

It is noted that, a solar panel having a photovoltaic power generation function may be provided on the top surface of the airship body 201, and an electric power generated by the solar panel is stored in the battery 204.

The unmanned airship-type HAPS 20 also includes an optical antenna apparatus 230 of the three-dimensional directivity as a communication section used for an optical communication with other HAPS and artificial satellites. In the example of FIG. 3, although the optical antenna apparatus 230 is disposed on an upper surface section of the airship object 201 and a lower surface section of the equipment accommodating section 203, the optical antenna apparatus 230 may be disposed on another section of the HAPS 20. Note that the communication section used for the optical communication with other HAPS and artificial satellites is not limited to the one that performs such optical communication, but may be one that performs a radio communication by another method such as a radio communication using radio waves such as microwaves.

Figure 4:
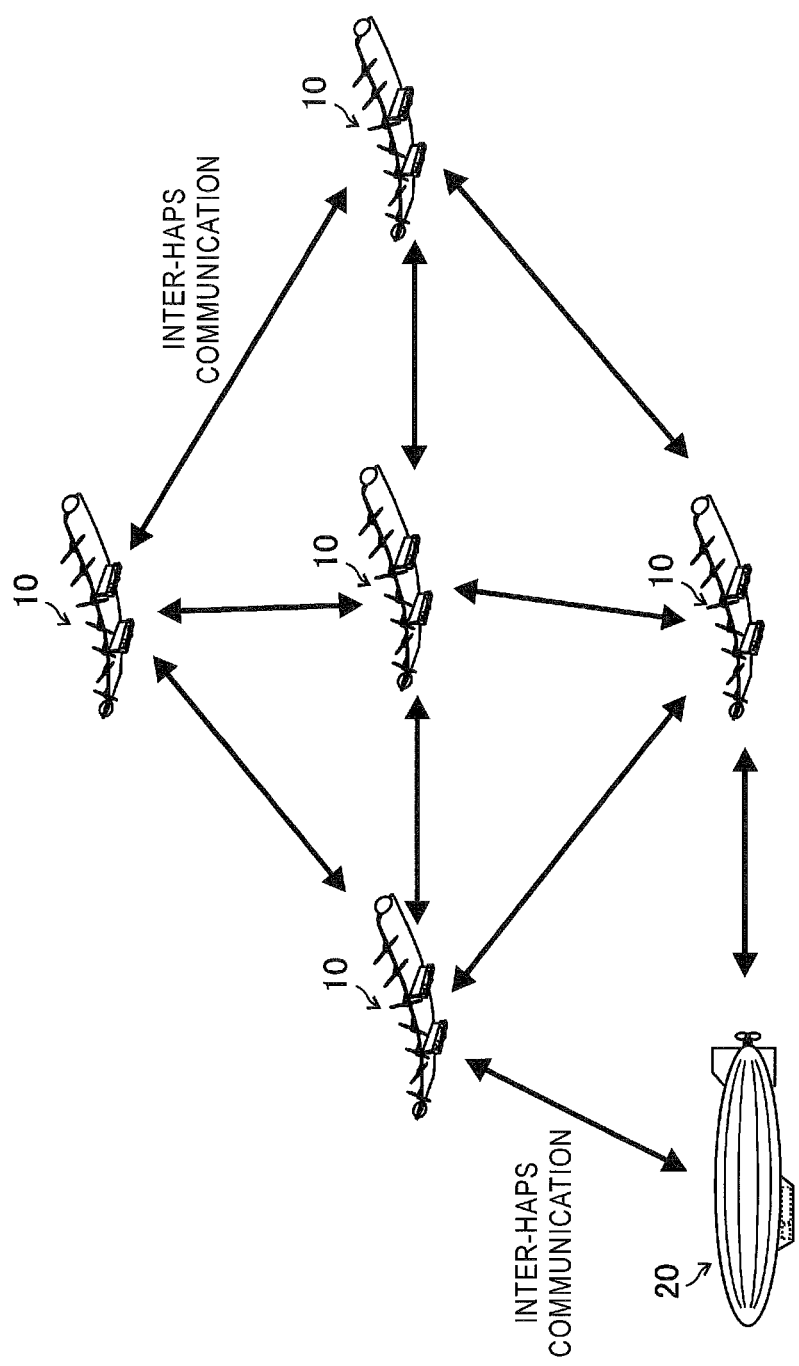
FIG. 4 is an explanatory diagram showing an example of a radio network formed in an upper airspace by a plurality of HAPSs in the embodiment.

FIG. 4 is an explanatory diagram showing an example of a radio network formed in an upper airspace with the plurality of HAPSs 10 and 20 in the embodiment.

The plurality of HAPSs 10 and 20 are configured to be able to perform an inter-HAPS communication by the optical communication with each other in an upper airspace, and form a radio communication network with excellent robustness capable of stably realizing a three-dimensional network over a wide area. This radio communication network can also function as an ad-hoc network by a dynamic routing according to various environments and various information. The radio communication network can be formed to have various two-dimensional or three-dimensional topologies, and may be, for example, a mesh-type radio communication network as shown in FIG. 4.

Figure 5:
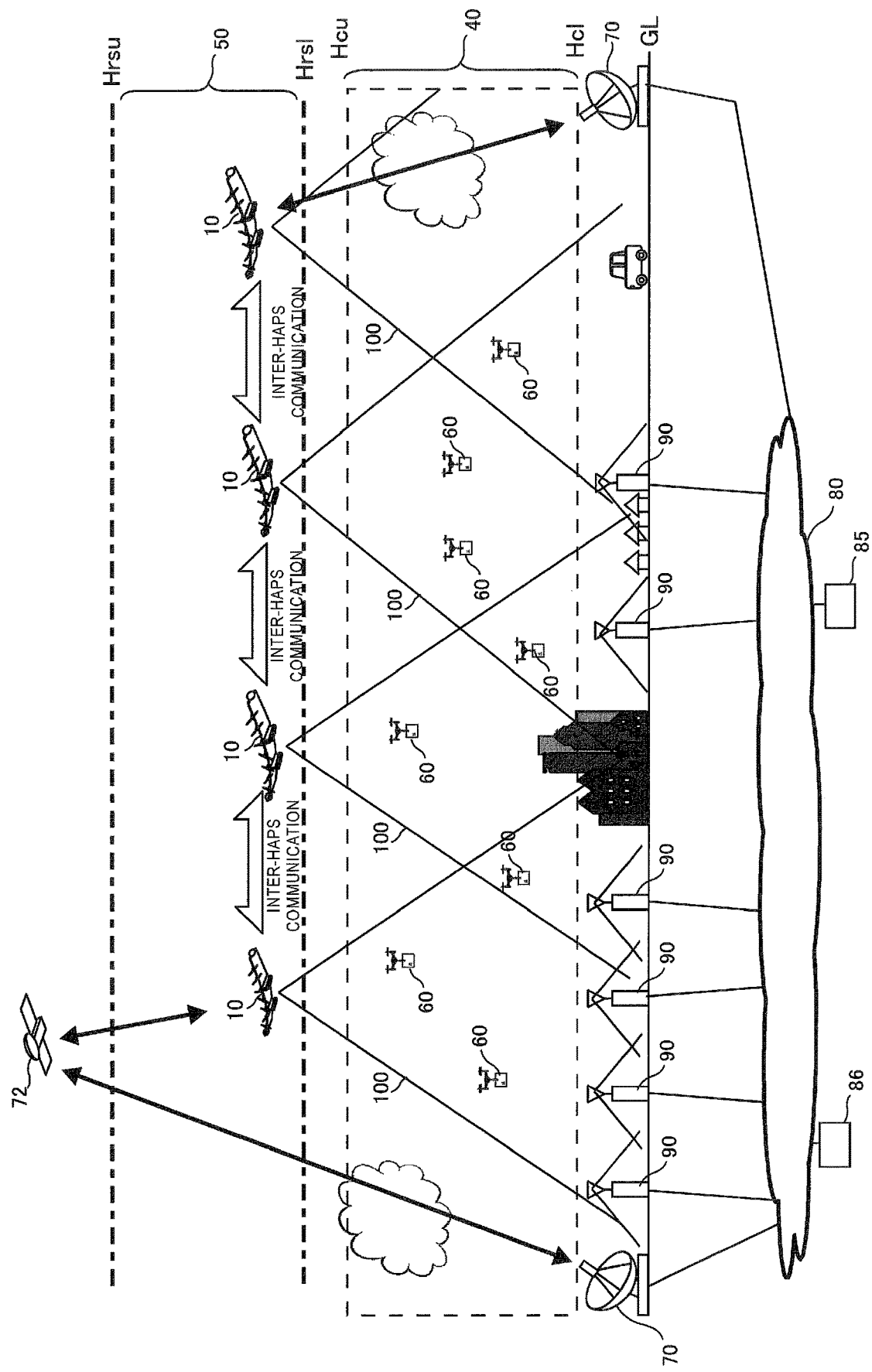
FIG. 5 is a schematic configuration diagram showing an example of an overall configuration of a communication system for realizing a three-dimensional network according to still another embodiment.

FIG. 5 is a schematic configuration diagram showing an example of an overall configuration of a communication system according to another embodiment.

It is noted that, in FIG. 5, configuration elements similar to those in FIG. 1 are denoted by the same reference numerals and explanation thereof will be omitted.

In the embodiment of FIG. 5, a communication between the HAPS 10 and the core network of the mobile communication network 80 is performed via the feeder station 70 and a low-orbit artificial satellite 72. In this case, a communication between the artificial satellite 72 and the feeder station 70 may be performed by a radio communication using radio waves such as microwaves, or may be performed by an optical communication using laser light or the like. A communication between the HAPS 10 and the artificial satellite 72 is performed by the optical communication using laser light or the like.

Figure 6:
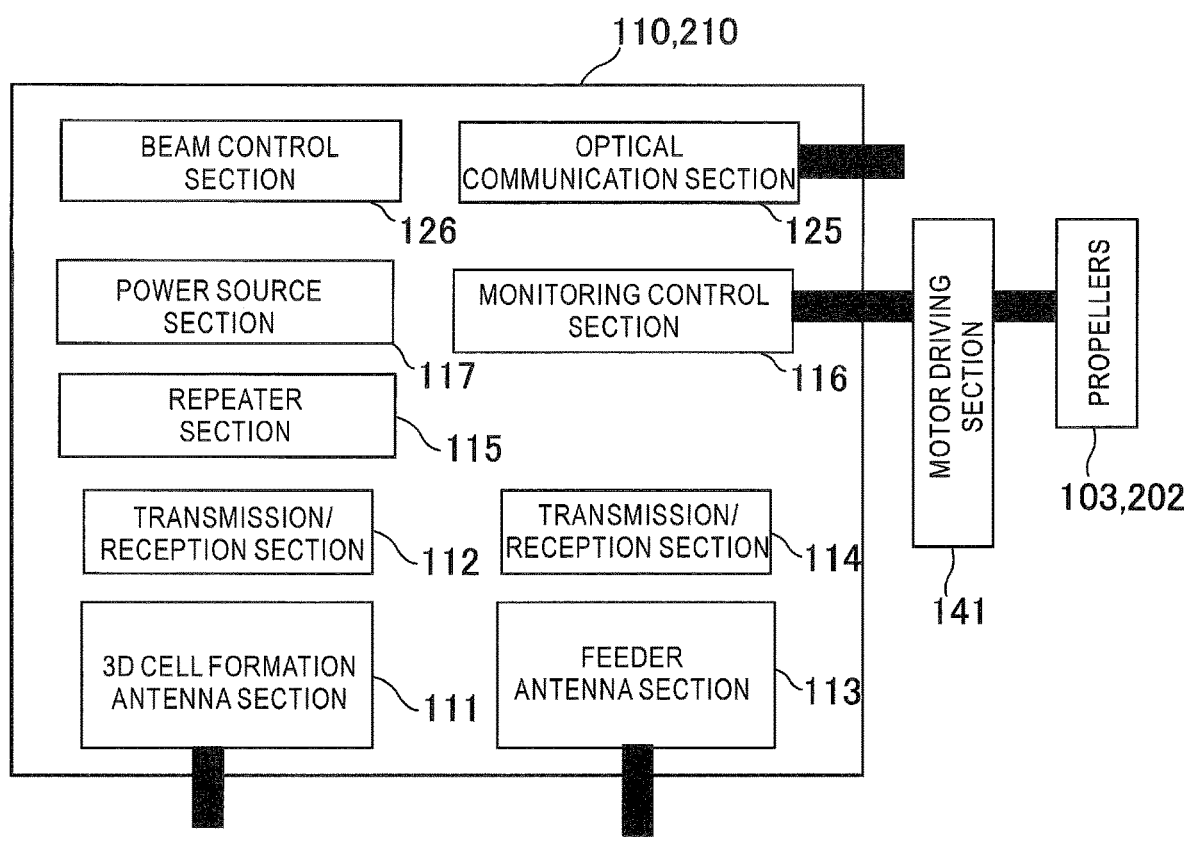
FIG. 6 is a block diagram showing a configuration example of a radio relay station of HAPS in the embodiment.

FIG. 6 is a block diagram showing a configuration example of radio relay stations 110 and 210 of the HAPSs 10 and 20 in the embodiment.

The radio relay stations 110 and 210 in FIG. 6 are examples of a repeater-type radio relay station. Each of the radio relay stations 110 and 210 includes a 3D cell-formation antenna section 111, a transmission/reception section 112, a feeder antenna section 113, a transmission/reception section 114, a repeater section 115, a monitoring control section 116, and a power source section 117. Furthermore, each of the radio relay stations 110 and 210 includes an optical communication section 125 used for the inter-HAPS communication and a beam control section 126.

The 3D cell-formation antenna section 111 has antennas for forming radial beams 100 and 200 toward the cell-formation target airspace 40, and forms three-dimensional cells 41 and 42 in which a communication with the terminal apparatus can be performed. The transmission/reception section 112 constitutes a first radio communication section with 3D cell-formation antenna section 111, has a transmission/reception duplexer (DUP: DUPlexer) and an amplifier, etc., and transmits radio signals to the terminal apparatuses located in the three-dimensional cells 41 and 42 and receives radio signals from the terminal apparatuses via the 3D cell-formation antenna section 111.

The feeder antenna section 113 has a directional antenna for performing a radio communication with the feeder station 70 on the ground or on the sea. The transmission/reception section 114 constitutes a second radio communication section with the feeder antenna section 113, has a transmission/reception duplexer (DUP: DUPlexer) and an amplifier, etc., and transmits radio signals to the feeder station 70 and receives radio signals from the feeder station 70 via the feeder antenna section 113.

The repeater section 115 relays signals of the transmission/reception section 112 which is transmitted to and received from the terminal apparatus and signals of the transmission/reception section 114 which is transmitted to and received from the feeder station 70. The repeater section 115 has an amplifier function that amplifies a relay target signal of a predetermined frequency to a predetermined level. The repeater section 115 may have a frequency conversion function for converting the frequency of the relay target signal.

The monitoring control section 116 is composed of, for example, a CPU and a memory, etc., and monitors the operation processing status of each section and controls each section in the HAPSs 10 and 20, by executing a preinstalled program. In particular, the monitoring control section 116 controls a motor driving section 141 that drives the propellers 103 and 202 to move the HAPSs 10 and 20 to a target position, and also controls to stay in the vicinity of the target position, by executing a control program.

The power source section 117 supplies an electric power outputted from the batteries 106 and 204 to each section in the HAPSs 10 and 20. The power source section 117 may have a function of storing an electric power generated by the solar power generation panel, etc. and an electric power supplied from outside in the batteries 106 and 204.

The optical communication section 125 communicates with neighboring other HAPSs 10 and 20 and the artificial satellite 72 via an optical communication medium such as laser light. By the communication, a dynamic routing that dynamically relays radio communication between a terminal apparatus such as the drone 60 and the mobile communication network 80 becomes possible, and a robustness of the mobile communication system can be improved by other HAPS backing it up and relaying wirelessly when either HAPS broke down.

The beam control section 126 controls a direction and intensity of a beam of laser light or the like used for the inter-HAPS communication or the communication with the artificial satellite 72, and performs control so as to switch another HAPS (radio relay station) that performs a communication using a light beam such as a laser light in accordance with a change in relative position with neighboring another HAPS (radio relay station). This control may be performed based on, for example, a position and posture of the HAPS itself, positions of neighboring HAPS, and the like. Information on the position and posture of the HAPS itself may be acquired based on an output of a GPS receiver, a gyro sensor, an acceleration sensor or the like incorporated in the HAPS, and information on the position of the neighboring HAPS may be acquired from the remote control apparatus 85 provided in the mobile communication network 80 or a server 86 such as a HAPS management server or an application server.

Figure 7:
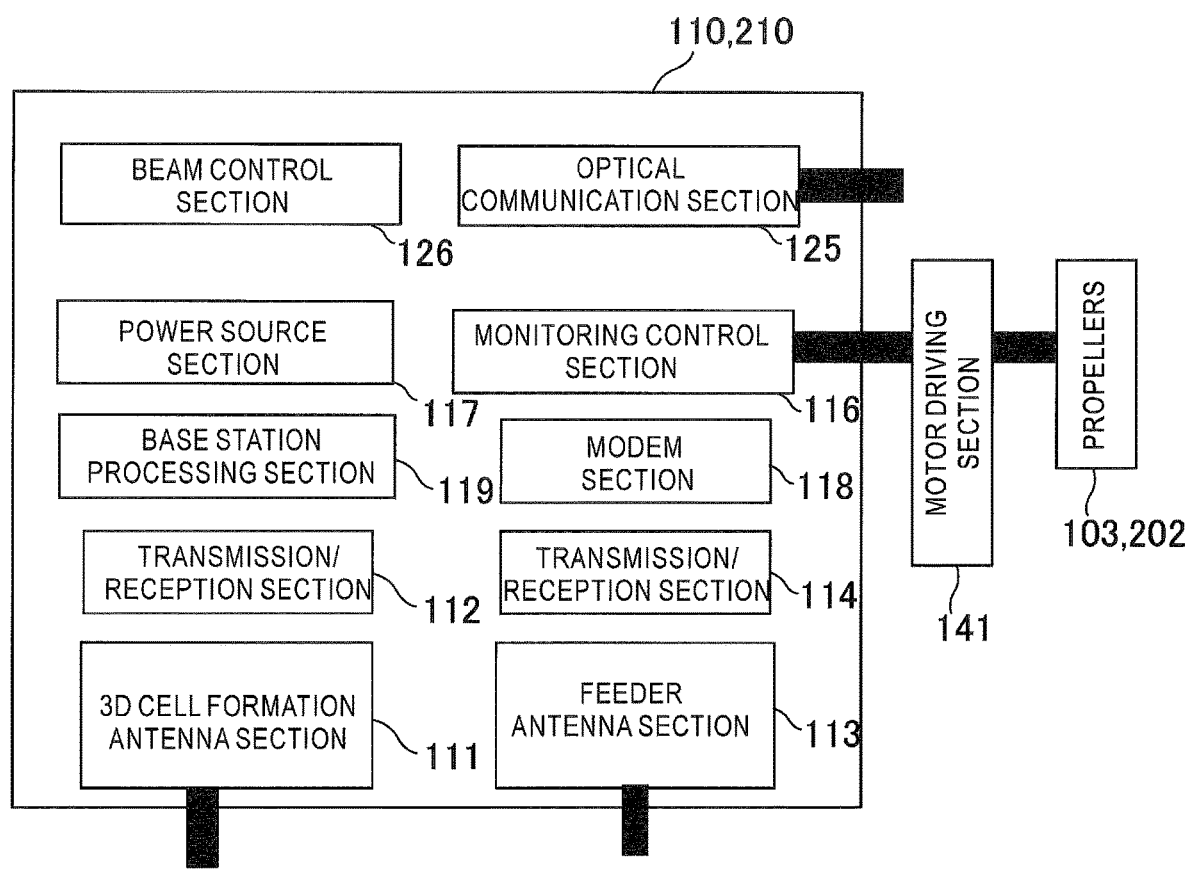
FIG. 7 is a block diagram showing another configuration example of a radio relay station of HAPS in the embodiment.

FIG. 7 is a block diagram showing another configuration example of the radio relay stations 110 and 210 of the HAPSs 10 and 20 in the embodiment.

The radio relay stations 110 and 210 in FIG. 7 are examples of base-station type radio relay station.

It is noted that, in FIG. 7, configuration elements similar to those in FIG. 6 are denoted by the same reference numerals and explanation thereof will be omitted. Each of the radio relay stations 110 and 210 in FIG. 7 further includes a modem section 118 and a base-station processing section 119 instead of the repeater section 115. Further, each of the radio relay stations 110 and 210 includes the optical communication section 125 and the beam control section 126.

The modem section 118, for example, performs a demodulation processing and a decoding processing for a reception signal received from the feeder station 70 via the feeder antenna section 113 and the transmission/reception section 114, and generates a data signal to be outputted to the base-station processing section 119. The modem section 118 performs an encoding processing and a modulation processing for the data signal received from the base-station processing section 119, and generates a transmission signal to be transmitted to the feeder station 70 via the feeder antenna section 113 and the transmission/reception section 114.

The base-station processing section 119, for example, has a function as an e-Node B that performs a baseband processing based on a method conforming to the standard of LTE/LTE-Advanced. The base-station processing section 119 may process in a method conforming to a future standard of mobile communication such as the fifth generation.

The base-station processing section 119, for example, performs a demodulation processing and a decoding processing for a reception signal received from a terminal apparatus located in the three-dimensional cells 41 and 42 via the 3D cell-formation antenna section 111 and the transmission/reception section 112, and generates a data signal to be outputted to the modem section 118. The base-station processing section 119 performs an encoding processing and a modulation processing for the data signal received from the modem section 118, and generates a transmission signal to be transmitted to the terminal apparatus of the three-dimensional cells 41 and 42 via the 3D cell-formation antenna section 111 and the transmission/reception section 112.

Figure 8:
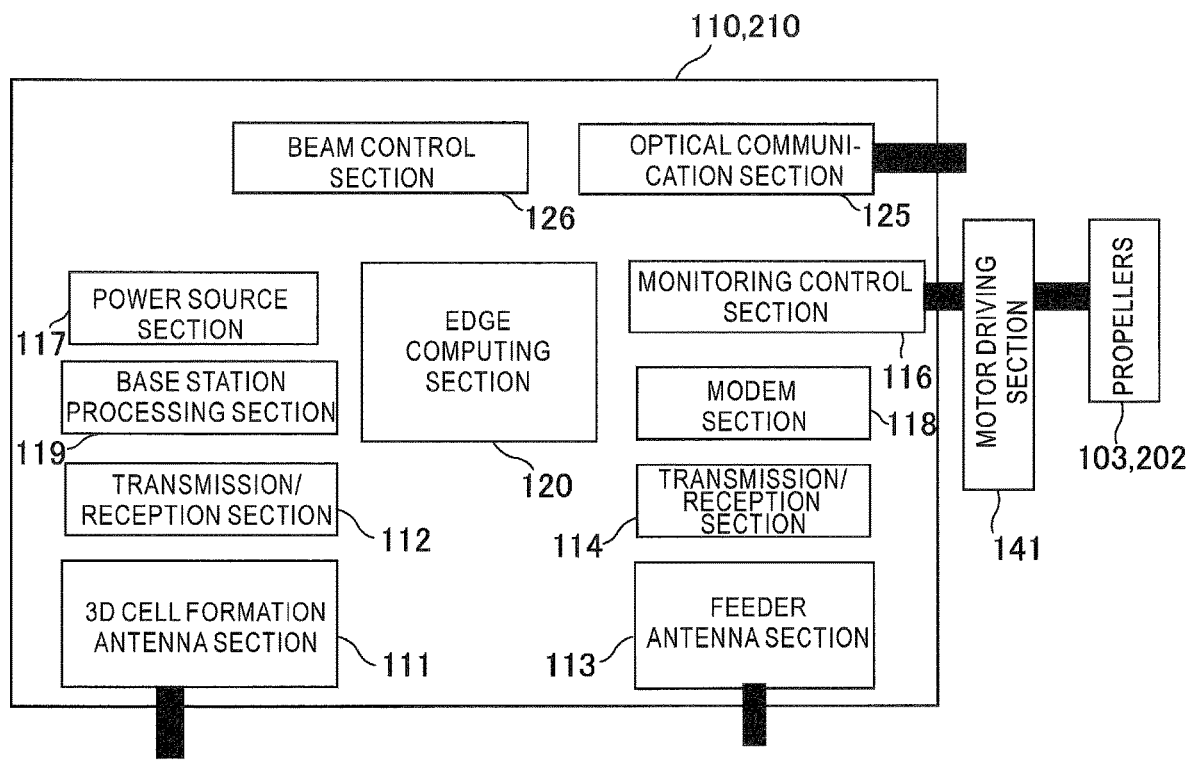
FIG. 8 is a block diagram showing still another configuration example of a radio relay station of HAPS in the embodiment.

FIG. 8 is a block diagram showing still another configuration example of radio relay stations 110 and 210 of the HAPSs 10 and 20 in the embodiment.

The radio relay stations 110 and 210 in FIG. 8 are examples of a high-performance base-station type radio relay station having an edge computing function. It is noted that, in FIG. 8, configuration elements similar to those in FIG. 6 and FIG. 7 are denoted by the same reference numerals and explanation thereof will be omitted. Each of the radio relay stations 110 and 210 in FIG. 8 further includes an edge computing section 120 in addition to the configuration elements of FIG. 7.

The edge computing section 120 is configured with, for example, a compact computer, and can perform various types of information processing relating to a radio relay, etc., in the radio relay stations 110 and 210 of the HAPSs 10 and 20, by executing a preinstalled program.

The edge computing section 120, for example, determines a transmission destination of a data signal based on the data signal received from a terminal apparatus located in the three-dimensional cells 41 and 42, and performs a process of switching a relay destination of communication based on the determination result. More specifically, in case that the transmission destination of the data signal outputted from the base-station processing section 119 is a terminal apparatus located in the own three-dimensional cells 41 and 42, instead of passing the data signal to the modem section 118, the edge computing section 120 returns the data signal to the base-station processing section 119 and transmits the data signal to the terminal apparatus of the transmission destination located in the own three-dimensional cells 41 and 42. On the other hand, in case that the transmission destination of the data signal outputted from the base-station processing section 119 is a terminal apparatus located in another cell other than the own three-dimensional cells 41 and 42, the edge computing section 120 passes the data signal to the modem section 118 and transmits the data signal to the feeder station 70, and transmits the data signal to the terminal apparatus of the transmission destination located in the other cell of the transmission destination via the mobile communication network 80.

The edge computing section 120 may perform a process of analyzing information received from a large number of terminal apparatuses located in the three-dimensional cells 41 and 42. This analysis result may be transmitted to the large number of terminal apparatuses located in the three-dimensional cells 41 and 42, and may be transmitted to the remote control apparatus 85 provided in the mobile communication network 80 or the server 86 such as a HAPS management server or an application server (application server).

Uplink and downlink duplex methods for radio communication with a terminal apparatus via the radio relay stations 110 and 210 are not limited to a specific method, and may be, for example, a time division duplex method (Time Division Duplex: TDD) or a frequency division duplex method (Frequency Division Duplex: FDD). An access method for radio communication with a terminal apparatus via the radio relay stations 110 and 210 is not limited to a specific method, and may be, for example, FDMA (Frequency Division Multiple Access) method, TDMA (Time Division Multiple Access) method, CDMA (Code Division Multiple Access) method or OFDMA (Orthogonal Frequency Division Multiple Access). In the foregoing radio communication, a MIMO (Multi-Input and Multi-Output) technology may be used, which has functions of diversity/coding, transmission beam forming, spatial division multiplexing (SDM: Spatial Division Multiplexing), etc., and in which a transmission capacity per unit frequency can be increased by simultaneously using a plurality of antennas for both of transmission and reception. The MIMO technology may be an SU-MIMO (Single-User MIMO) technology in which one base station transmits a plurality of signals to one terminal apparatus at the same time/same frequency, and may be an MU-MIMO (Multi-User MIMO) technology in which one base station transmits signals to a plurality of different communication terminal apparatuses at the same time/same frequency or a plurality of different base stations transmit signals to one terminal apparatus at the same time/same frequency.

Hereinafter, although a case where a radio relay apparatus for performing a radio communication with a terminal apparatus is the solar plane-type HAPS 10 having the radio relay station 110 will be described, the following embodiments can be similarly applied to another radio relay apparatus capable of moving in an upper airspace such as the unmanned airship-type HAPS 20 having the radio relay station 210.

A link between the HAPS 10 having the radio relay station 110 and the base station 90 via the gateway station (hereinafter referred to as "GW station") 70 as a feeder station is referred to as a "feeder link", and a link between the HAPS 10 and a terminal apparatus 61 is referred to as a "service link". In particular, a section between the HAPS 10 and the GW station 70 is referred to as a "feeder-link radio section". Further, a downlink of a communication from the GW station 70 to the terminal apparatus 61 via the HAPS 10 is referred to as "forward link", and an uplink of a communication from the terminal apparatus 61 to the GW station 70 via the HAPS 10 is referred to as "reverse link".

Figure 9:
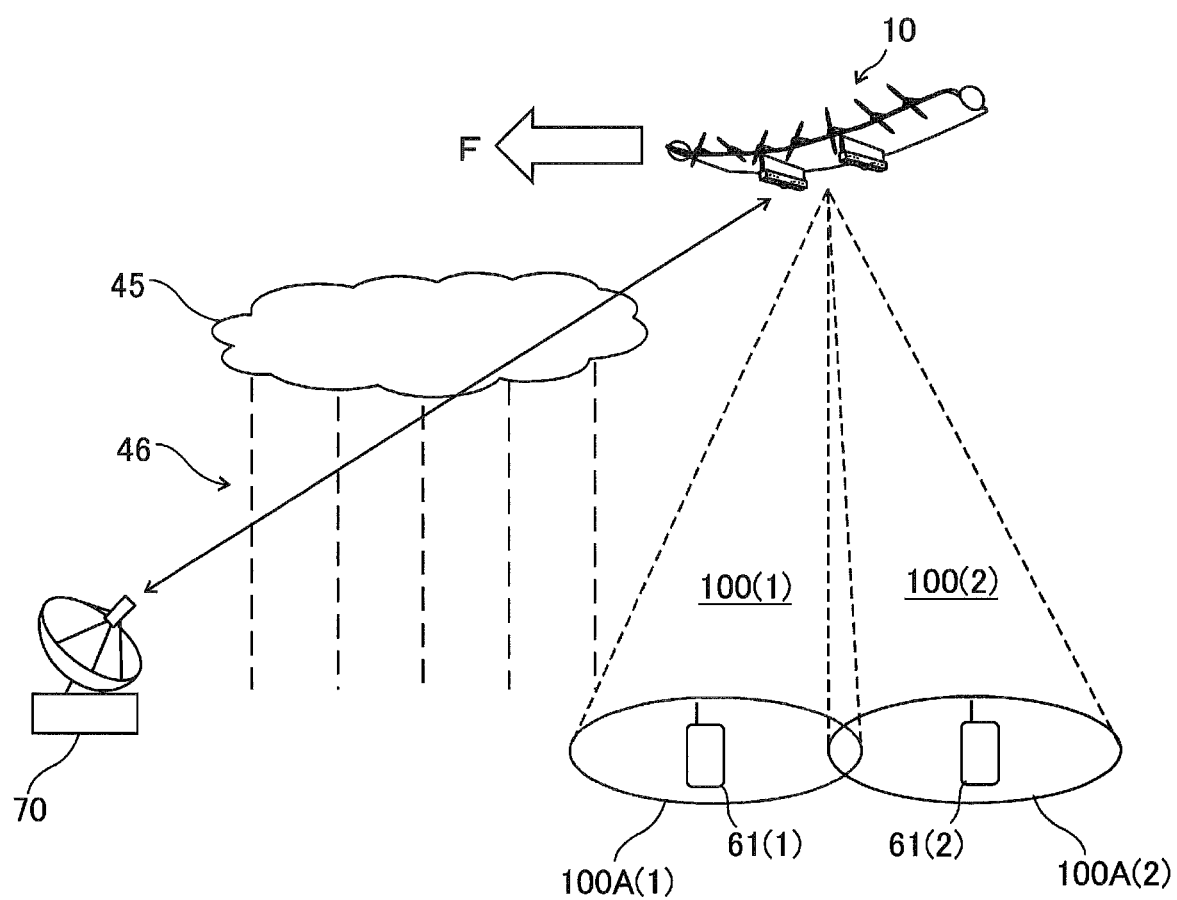
FIG. 9 is an explanatory diagram showing an example of a positional relationship between a HAPS that flies while forming a plurality of cells and a gateway station.

FIG. 9 is an explanatory diagram showing an example of a positional relationship between the HAPS 10 that flies while forming a plurality of cells 100A(1) and 100A(2) and the GW station 70. The HAPS 10 is flying in a left direction F in the figure while forming two-dimensional cells 100A(1) and 100A(2) on the ground by a plurality of beams 100(1) and 100(2). A three-dimensional cell is formed by a space surrounded by the beams 100(1) and 100(2) and the cells 100A(1) and 100A(2). A radio relay station of the HAPS 10 flying in the flight direction F performs a radio communication with the GW station 70 of the mobile communication network via the feeder-link radio section. The radio relay station of the HAPS 10 performs a radio communication with the terminal apparatuses 61(1) and 61(2) located in each cell 100A(1) and 100A(2) via the service link.

In the feeder link in FIG. 9, by an attenuation due to a cloud 45 and a rainfall 46 in an upper airspace and a limitation of transmission electric power, etc., there is a possibility that sufficient reception power cannot be obtained at the radio relay station of the HAPS 10, the GW station 70 and the base station 90. In particular, in a feeder link using a high frequency band such as several GHz band to several tens GHz band, the influence of the attenuation and the limitation of transmission electric power is large, and the reception power tends to decrease.

Therefore, in each embodiment shown below, a plurality of GW stations that can simultaneously transmit and receive signals to and from the radio relay station of the HAPS 10 are disposed, a site diversity is performed in which a same signal is simultaneously transmitted and received through a plurality of feeder links between each GW station and the radio relay station of the HAPS 10, or in which a GW station (feeder link) that transmits and receives signals to and from the radio relay station of the HAPS 10 is switched.

Figure 10:
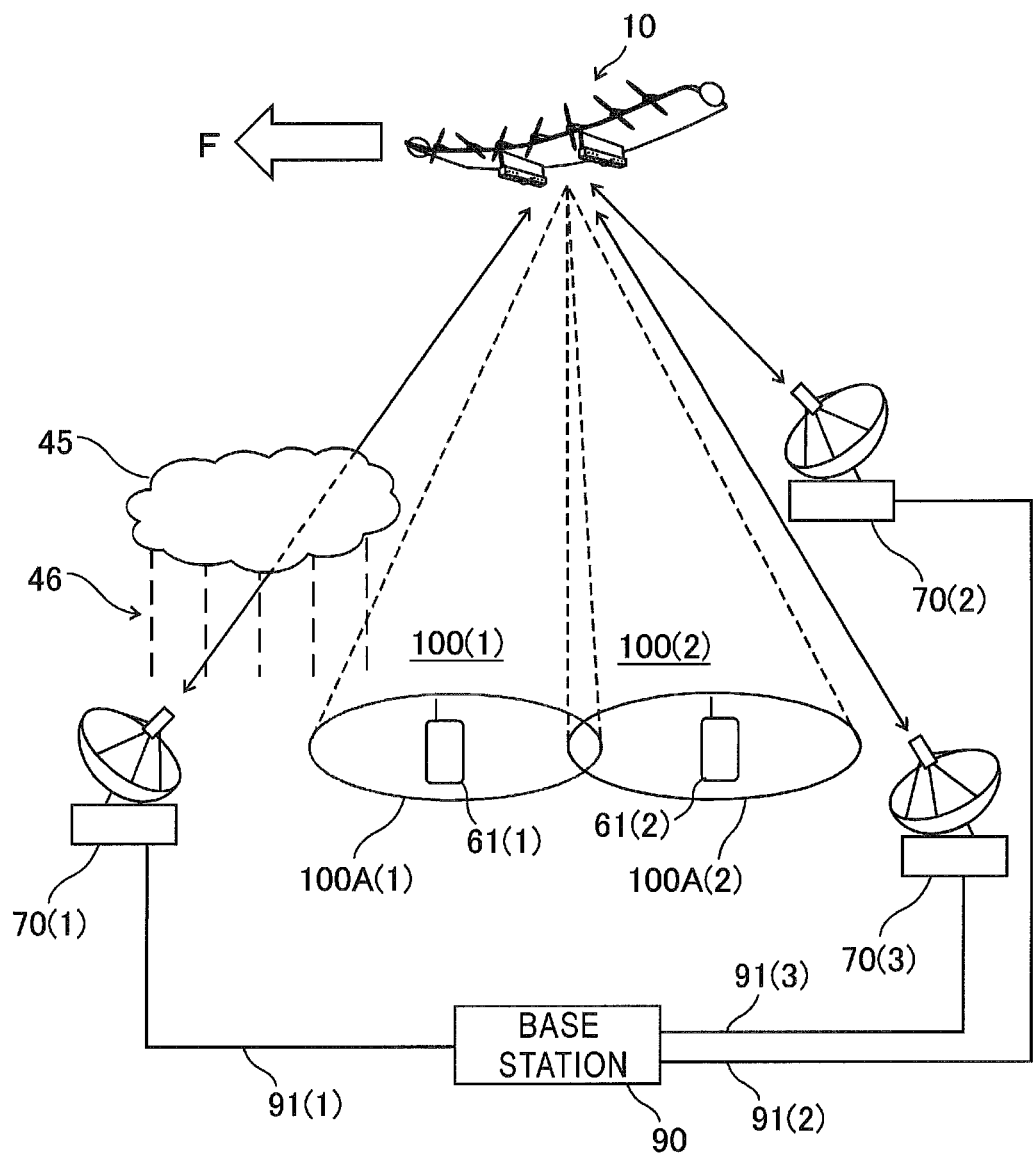
FIG. 10 is an explanatory diagram showing an example of a positional relationship between a plurality of gateway stations and a HAPS in a communication system according to the embodiment.

FIG. 10 is an explanatory diagram showing an example of a positional relationship between the plurality of GW stations 70(1) to 70(3) and the HAPS 10 in a communication system according to the embodiment. The plurality of GW stations 70(1) to 70(3) are disposed at different positions geographically separated from each other and are connected to the base station 90 by an optical extension line (optical line) that is a high-speed wired line. The plurality of GW stations 70(1) to 70(3) are time-synchronized with each other. A method to match synchronization with between the GW stations may be a method using GPS signals received by each GW station, or a method in which each GW station synchronizes via Ethernet (registered trademark) (for example, a method based on IEEE1588). In addition, although the case where the number of GW stations is 3 stations is illustrated in FIG. 10, the number of GW stations may be 2 stations or 4 stations or more.

In FIG. 10, when either feeder link of the plurality of feeder links formed between the HAPS 10 in the upper airspace and the plurality of GW stations 70(1) to 70(3) is affected by attenuation such as the rainfall 46, a communication between the radio relay apparatus and the GW station can be performed via another feeder link that is not affected by attenuation such as rainfall, and a sufficient received power can be obtained in each of the HAPS 10 and the GW station.

For example, when the same signal is simultaneously transmitted/received with the plurality of feeder links via the plurality of GW stations 70(1) to 70(3), even if an area of the cloud 45 or the rainfall 46 occurs in the feeder-link radio section of the first GW station 70(1) and an attenuation of the radio signal increases, the simultaneous transmission/reception of the same signal is continued via each of the feeder links of the other second GW station 70(2) and third GW station 70(3), and a sufficient reception power can be obtained in each of the HAPS 10 and the GW stations 70(2) and 70(3).

For example, when a signal is transmitted/received with the feeder link via the first GW station 70(1), even if an area of the cloud 45 or the rainfall 46 occurs in the feeder-link radio section and an attenuation of the radio signal increases, transmission and reception of the signal is continued by switching to another second GW station 70(2) or third GW station 70(3) that is not affected by the cloud 45 or the rainfall 46, and a sufficient reception power can be obtained in the HAPS 10 and the GW stations 70(2) and 70(3).

In the foregoing communication system of the embodiment, if distances between the flying HAPS 10 and each of the plurality of GW stations 70 are different from each other, propagation distances of radio signals via the feeder links between the HAPS 10 and the GW station 70 are different from each other in the plurality of GW stations 70. Further, if distances between the base station 90 and the plurality of GW stations 70 are different from each other, transmission distances of signals via optical extension lines 91 between the base station 90 and the GW stations 70 are different from each other in the plurality of GW stations 70. In this way, the propagation distances and the transmission distances of the signals are different from each other, it becomes a multipath environment in which time delay differences (signal-arrival timing differences) occur in the plurality of reception signals received by the base station 90 and the HAPS 10 in the forward link and the reverse link via the plurality of feeder links, and a communication quality of the feeder link may be deteriorated.

Figure 11A:
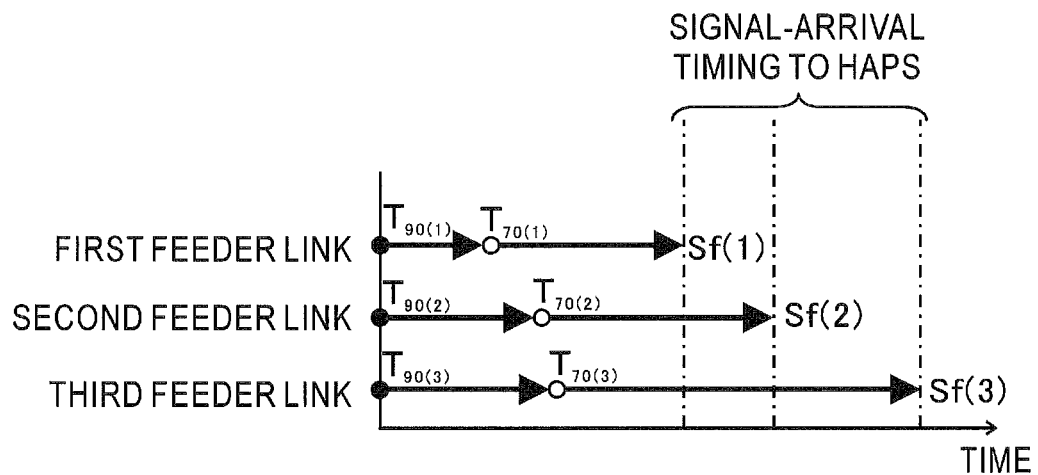
FIG. 11A is an explanatory diagram showing an example of a time delay difference (signal-arrival timing difference) of reception signals due to a multipath environment between a HAPS and a base station via a plurality of GW stations.
Figure 11B:
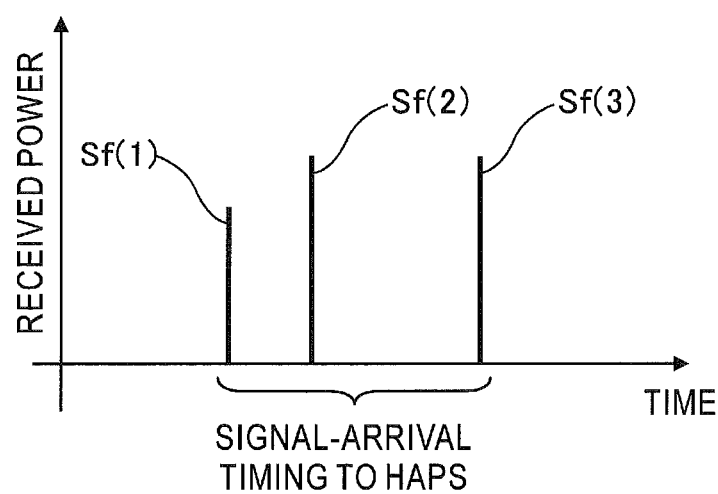
FIG. 11B is an explanatory diagram showing an example of time delay differences (signal-arrival timing differences) of reception signals due to a multipath environment between a HAPS and a base station via a plurality of GW stations.

FIG. 11A and FIG. 11B are explanatory diagrams showing an example of time delay differences (signal-arrival timing differences) of reception signals due to a multipath environment between the HAPS 10 and the base station 90 via the plurality of GW stations 70(1) to 70(3). The present example is an example of forward links for transmitting the same signals Sf(1) to Sf(3) from the base station 90 to the HAPS 10 via the feeder links of the plurality of GW stations 70(1) to 70(3) respectively in the communication system of FIG. 10. In FIG. 11A, each of $T_{90(1)}$ to $T_{90(3)}$ indicates a time (timing) at which the base station 90 transmits each of forward link signals Sf(1) to Sf(3) to each of the GW stations 70(1) to 70(3). Further, each of $T_{70(1)}$ to $T_{70(3)}$ indicates a time (timing) at which each of the GW stations 70(1) to 70(3) transmits each of the forward link signals Sf(1) to Sf(3) received from the base station 90, to the HAPS 10.

In the plurality of the first to third feeder links via the plurality of GW stations 70(1) to 70(3) respectively in FIG. 11A, the base station 90 transmits the same forward link signals Sf(1) to Sf(3) to the HAPS 10 at the same transmission timings (same times) $T_{90(1)}$ to $T_{90(3)}$. Each of the forward link signals Sf(1) to Sf(3) transmitted from the base station 90 shifts by a transmission delay time corresponding to each of the transmission distances of the optical extension lines 91(1) to 91(3) of the feeder links. Each of the GW stations 70(1) to 70(3) relays the reception signal as it is, and transmits it toward the HAPS 10 at respective transmission timings $T_{70(1)}$ to $T_{70(3)}$ shifted by the transmission delay times. Each of the forward link signals Sf(1) to Sf(3), which is transmitted from each of the GW stations 70(1) to 70(3), further shifts by a propagation delay time corresponding to a propagation distance of a radio section of each feeder link and arrives at the HAPS 10 (see FIG. 11B). In this way, since the propagation distances and transmission distances of the signals between the feeder links are different from each other, it becomes a multipath environment in which time delay differences (signal-arrival timing differences) occur in the plurality of reception signals received by the base station 90 and the HAPS 10 in the forward link via the plurality of feeder links, and a communication quality of the forward link in the feeder link may be deteriorated.

As described above, when transmitting by simultaneous transmissions/receptions from the GW stations 70(1) to 70(3) spatially separated from each other or by switching the GW stations, there is a possibility that the communication quality deteriorates in the forward link and the reverse link by a delay dispersion of the radio signal occurs due to a difference of path lengths from the GW stations 70(1) to 70(3) to the HAPS 10, and a delay dispersion of the transmission signal occurs due to a difference of path length from the base station 90 to the GW stations 70(1) to 70(3).

Therefore, in the present embodiments, each of the plurality of GW stations 70(1) to 70(3) controls the signal transmission timing to be shifted by an offset that is set in accordance with the transmission/propagation delay time in the forward link for transmitting the signal from the base station 90 to the HAPS 10 via the GW station 70. Herein, the transmission timing to be controlled is, for example, a time timing at beginning of a radio frame, a subframe, a resource block, a slot, or a symbol on the time axis conforming to the LTE/LTE-Advanced standard.

It is noted that, in the following examples, although an offset setting and a transmission timing control when transmitting and receiving a same signal via the plurality of feeder links will be described, similar offset setting and transmission timing control can also be applied when transmitting and receiving a signal by switching the plurality of feeder links.

Figure 12A:
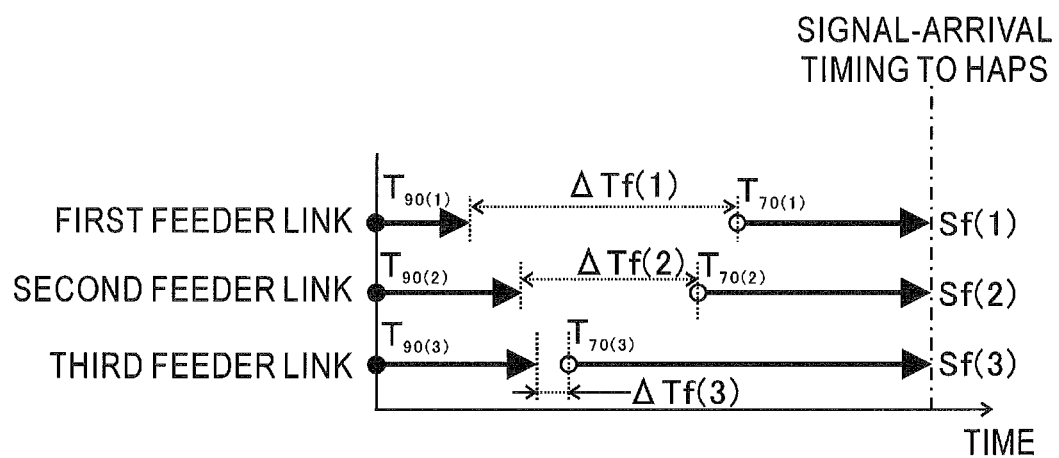
FIG. 12A is an explanatory diagram showing an example of a transmission/reception timing control of a signal in a forward link via a plurality of GW stations in a communication system according to the embodiment.
Figure 12B:
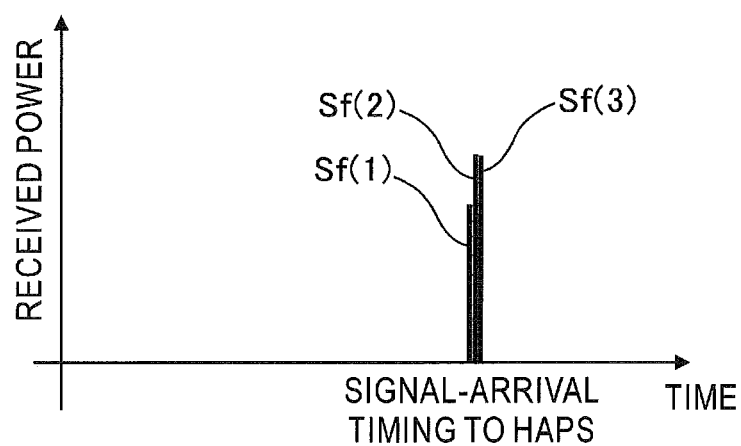
FIG. 12B is an explanatory diagram showing an example of a transmission/reception timing control of a signal in a forward link via a plurality of GW stations in a communication system according to the embodiment.

FIG. 12A and FIG. 12B are explanatory diagrams showing an example of a transmission/reception timing control of the signals Sf(1) to Sf(3) in the forward link via the plurality of GW stations 70(1) to 70(3) in a communication system according to the embodiment. In a plurality of the first to third feeder links in FIG. 12A, the base station 90 transmits the same forward link signals Sf(1) to Sf(3) to the HAPS 10 at the same transmission timings (same times) $T_{90(1)}$ to $T_{90(3)}$. Each of the forward link signals Sf(1) to Sf(3), which is transmitted from the base station 90, shifts by the transmission delay times corresponding to the transmission distance of each of the optical extension lines 91(1) to 91(3) of the feeder links and arrives at each of the GW stations 70(1) to 70(3). Each of the GW stations 70(1) to 70(3) transmits to the HAPS 10 at each of the transmission timings $T_{70(1)}$ to $T_{70(3)}$ shifted by offsets $\Delta Tf(1)$ to $\Delta Tf(3)$ that are set in accordance with the transmission delay time and the propagation delay time (propagation delay time in accordance with the distance between the GW station and the HAPS) of the radio sections of feeder link. In the present example, since the transmission delay time and propagation delay time of the first feeder link among the three feeder links are relatively short, the offset $\Delta Tf(1)$ of the first feeder link is set longer. The offset $\Delta Tf(3)$ of the third feeder link is set shorter, since the transmission delay time and the propagation delay time of the third feeder link are relatively long. In this way, the forward link signals Sf(1) to Sf(3), which are transmitted from each of the GW stations 70(1) to 70(3) with the predetermined offsets, shift by the transmission delay time of the radio section of each feeder link and arrive at the HAPS 10 at the same time (see FIG. 12B). Therefore, it is possible to prevent the deterioration of the communication quality of the forward links in the feeder links when a site diversity is applied by the plurality of GW stations 70(1) to 70(3).

Figure 13:
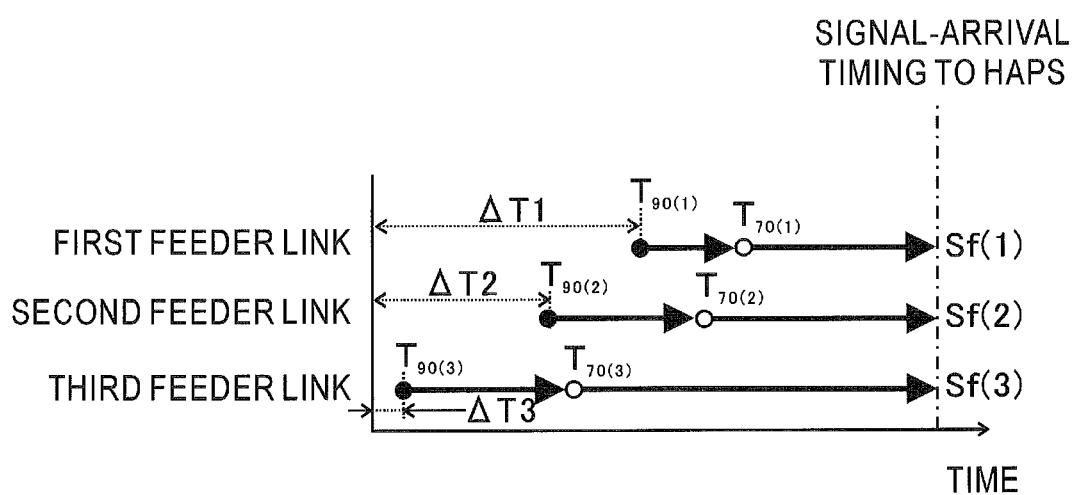
FIG. 13 is an explanatory diagram showing another example of a transmission/reception timing control of a signal in a forward link via a plurality of GW stations in a communication system according to the embodiment.

FIG. 13 is an explanatory diagram showing another example of the transmission/reception timing control of the signals Sf(1) to Sf(3) in the forward link via the plurality of GW stations 70(1) to 70(3) in a communication system according to the embodiment. In a plurality of the first to third feeder links in FIG. 13, the base station 90 transmits the same forward link signals Sf(1) to Sf(3) to the GW station 70(1) to 70(3) respectively at the transmission timings $T_{90(1)}$ to $T_{90(3)}$ shifted by the offsets $\Delta Tf(1)$ to $\Delta Tf(3)$ that are set in accordance with the transmission delay time between the GW stations 70(1) to 70(3) and the propagation delay time in a radio section of each feeder link (propagation delay time in accordance with a distance between the GW station and HAPS). The forward link signals Sf(1) to Sf(3), which are transmitted from the base station 90, respectively shift by the transmission delay times corresponding to the transmission distances of the optical extension lines 91(1) to 91(3) of the feeder links and arrive at the GW station 70(1) to 70(3). The GW stations 70(1) to 70(3) transmits to the HAPS 10 at the transmission timings $T_{70(1)}$ to $T_{70(3)}$ without any offset setting. In this way, the forward link signals Sf(1) to Sf(3), which are transmitted from the base station 90 with the predetermined offsets shifted, respectively shift by the propagation delay times of the radio sections of feeder links via the GW stations 70(1) to 70(3) and simultaneously arrive at the HAPS 10. Therefore, it is possible to prevent the deterioration of the communication quality of the forward links in the feeder links when a site diversity is applied by the plurality of GW stations 70(1) to 70(3).

Figure 14:
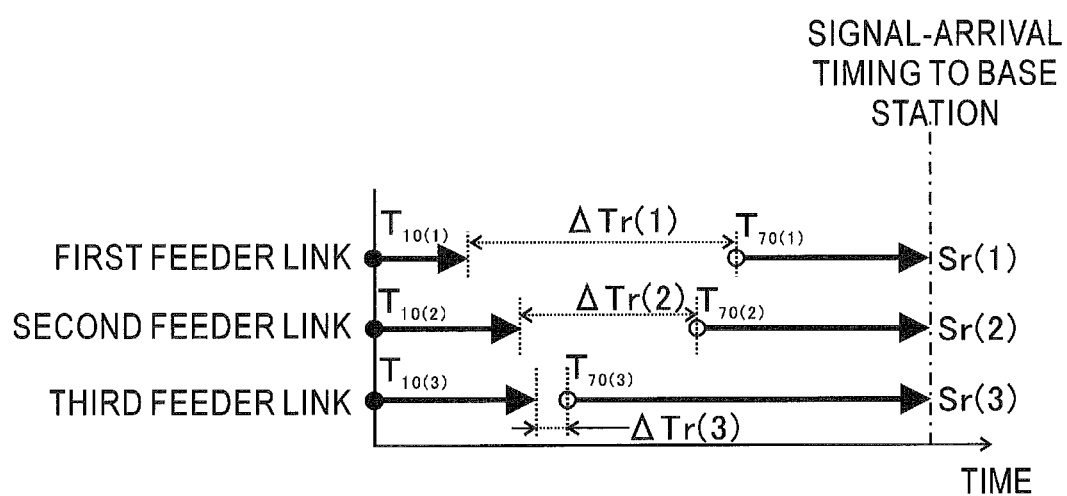
FIG. 14 is an explanatory diagram showing an example of a transmission/reception timing control of a signal in a reverse link via a plurality of GW stations in a communication system according to the embodiment.

FIG. 14 is an explanatory diagram showing an example of transmission/reception timing control of the signals Sr(1) to Sr(3) in a reverse link via the plurality of GW stations 70(1) to 70(3) in a communication system according to the embodiment. In a plurality of the first to third feeder links in FIG. 14, the HAPS 10 transmits the same reverse link signals Sr(1) to Sr(3) to the GW stations 70(1) to 70(3) respectively at the same transmission timings (same times) $T_{10(1)}$ to $T_{10(3)}$. Each of the reverse link signals Sr(1) to Sr(3), which are transmitted from the HAPS 10, shifts by a propagation delay time in accordance with a propagation distance of a radio section of each feeder link and arrives at each of the GW stations 70(1) to 70(3). The GW stations 70(1) to 70(3) receive the signals respectively at reception timings $T_{70(1)}$ to $T_{70(3)}$ shifted by the offsets $\Delta Tr(1)$ to $\Delta Tr(3)$ that are set in accordance with a propagation delay time and a transmission delay time according to a distance between the GW station of each feeder link and the base station 90, thereafter, the reception signals are transmitted toward the base station 90. In this way, the reverse link signals Sr(1) to Sr(3), which are respectively received at the GW station 70(1) to 70(3) with the predetermined offsets shifted, shift by the transmission delay times of the feeder links and arrive at the base station 90 simultaneously. Therefore, it is possible to prevent the deterioration of the communication quality of the reverse links in the feeder links when a site diversity is applied by the plurality of GW stations 70(1) to 70(3).

Figure 15:
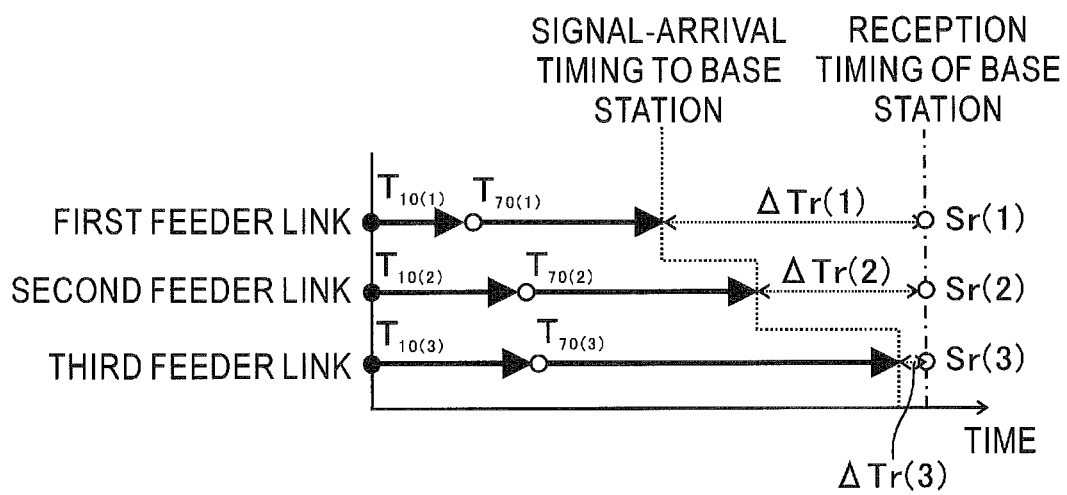
FIG. 15 is an explanatory diagram showing another example of a transmission/reception timing control of a signal in a reverse link via a plurality of GW stations in a communication system according to the embodiment.

FIG. 15 is an explanatory diagram showing another example of a transmission/reception timing control of the signals Sr(1) to Sr(3) in a reverse link via the plurality of GW stations 70(1) to 70(3) in a communication system according to the embodiment. In a plurality of the first to third feeder links in FIG. 15, the HAPS 10 transmits the same reverse link signals Sr(1) to Sr(3) to the GW station 70(1) to 70(3) respectively at the transmission timings $T_{10(1)}$ to $T_{10(3)}$ shifted by the offsets $\Delta Tr(1)$ to $\Delta Tr(3)$ that are set in accordance with a propagation delay time between each GW station 70(1) to 70(3) and a transmission delay time between the GW station of each feeder link and the base station. The reverse link signals Sr(1) to Sr(3), which are transmitted from the HAPS 10, shift by a propagation delay time corresponding to a propagation distance of a radio section of each feeder link and arrive at the GW stations 70(1) to 70(3) respectively. The GW stations 70(1) to 70(3) transmit to the base station 90 at transmission timings $T_{70(1)}$ to $T_{70(3)}$ without any offset setting. In this way, the reverse link signals Sr(1) to Sr(3), which are transmitted from the HAPS 10 with the predetermined offsets shifted, respectively shift by the transmission delay times of the feeder link via the GW stations 70(1) to 70(3) and arrive at the base station 10 simultaneously. Therefore, it is possible to prevent the deterioration of the communication quality of the reverse links in the feeder links when a site diversity is applied by the plurality of GW stations 70(1) to 70(3).

The offsets ΔTf(1) to ΔTf(3) and ΔTr(1) to ΔTr(3) in the plurality of feeder links are, for example, calculated and set based on the distances between the base station 90 and each GW station 70(1) to 70(3) and the distances between each GW station 70(1) to 70(3) and the HAPS 10. Herein, if the transmission delay times corresponding to the distances between the base station 90 and the GW stations 70(1) to 70(3) are substantially the same, the offsets ΔTf(1) to ΔTf(3) and ΔTr(1) to ΔTr(3) may be calculated and set based on the distances between the GW stations 70(1) to 70(3) and the HAPS 10. Further, if the propagation delay times corresponding to the distances in the feeder-link radio sections between the GW stations 70(1) to 70(3) and the HAPS 10 are substantially the same, the offsets ΔTf(1) to ΔTf(3) and ΔTr(1) to ΔTr(3) may be calculated and set based on the distances between the base station 90 and the GW stations 70(1) to 70(3).

Further, the feeder link (for example, the third feeder link in FIG. 11A) having the longest propagation/transmission delay time among the plurality of feeder links may be used as a reference, the offset of the reference feeder link may be set to zero, and the offsets of other feeder links (for example, the first and second feeder links in FIG. 11A) may be calculated and set.

Further, the offsets ΔTf(1) to ΔTf(3) and ΔTr(1) to ΔTr(3) may be calculated by the GW stations 70(1) to 70(3) and set, or may be calculated by the base station 90, the aforementioned remote control apparatus 85 or server 86, and the calculation result may be transmitted to the GW stations 70(1) to 70(3).

The offsets ΔTf(1) to ΔTf(3) and ΔTr(1) to ΔTr(3) may be calculated and set based on position information of the base station 90, the GW stations 70(1) to 70(3) and the HAPS 10. For example, the distances between the GW stations 70(1) to 70(3) and the HAPS 10 and the distances between the base station 90 and each GW station 70(1) to 70(3) may be calculated, and the offsets ΔTf(1) to ΔTf(3) and ΔTr(1) to ΔTr(3) may be calculated and set based on the distances respectively. Herein, the position information of the base station 90, the GW stations 70(1) to 70(3) and the HAPS 10 may be acquired from each apparatus (the base station 90, the GW stations 70(1) to 70(3) and the HAPS 10), or may be acquired from the aforementioned remote control apparatus 85 or server 86 for managing such information. The offsets ΔTf(1) to ΔTf(3) and ΔTr(1) to ΔTr(3) may be calculated based on measurement results of the propagation/transmission delay time.

Figure 16:
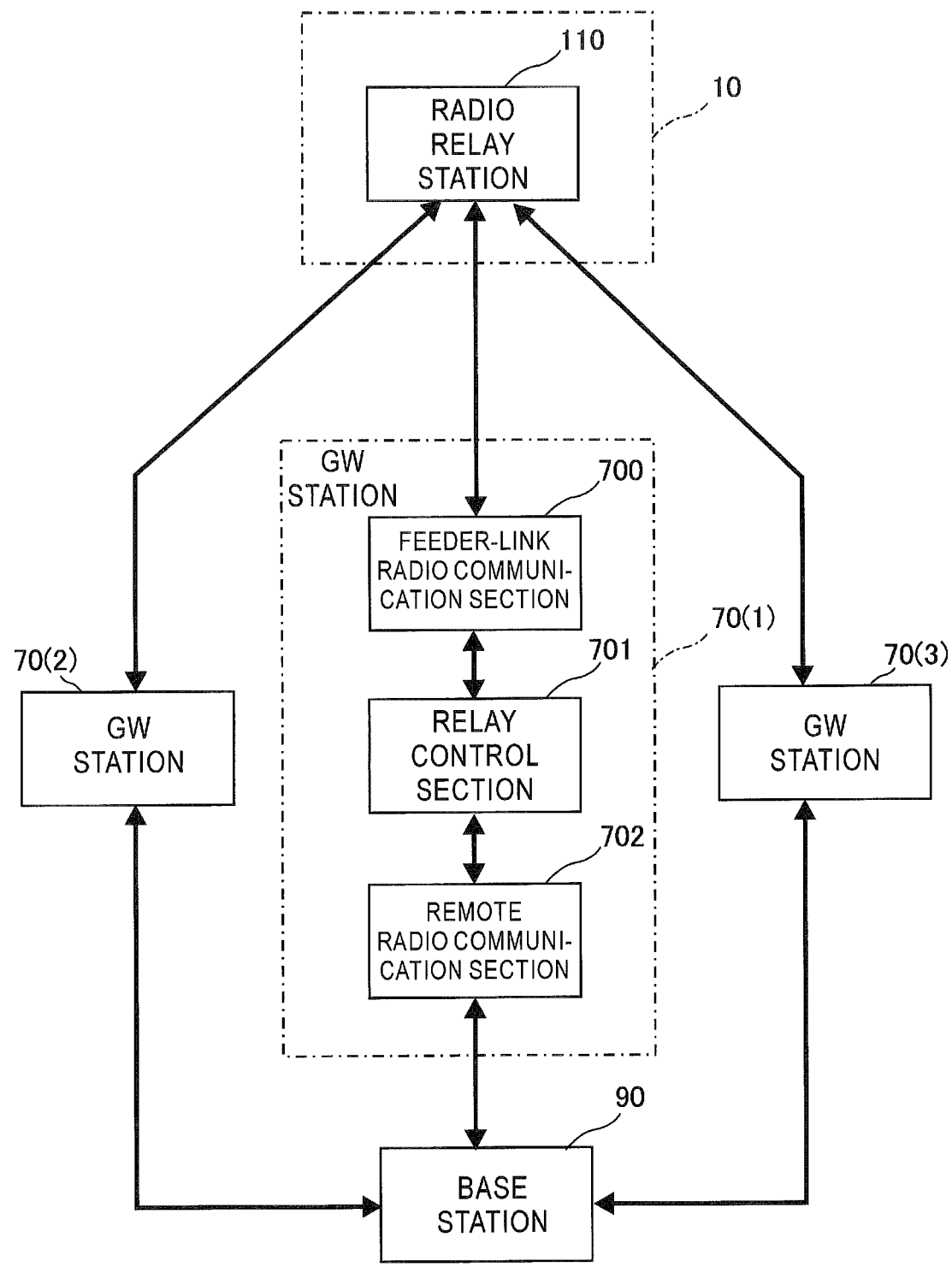
FIG. 16 is a block diagram showing a configuration example of a main section of a GW station in a communication system according to the embodiment.

FIG. 16 is a block diagram showing a configuration example of a main section of the GW station 70 in a communication system according to the embodiment. It is noted that, in FIG. 16, although only the configuration example of the first GW station 70(1) among the plurality of GW stations is illustrated, the other second GW station 70(2) and the third GW station 70(3) can be similarly configured.

In FIG. 16, the GW station 70(1) functions as a master repeater, and includes a feeder-link radio communication section 700, a relay control section 701, and a remote radio communication section 702. The feeder-link radio communication section 700 includes, for example, an antenna, a high frequency amplifier, a frequency converter, and the like, and wirelessly communicates with the radio relay station 110 of the HAPS 10 via the feeder-link radio section. The remote radio communication section 702 communicates with the base station 90 via an optical extension line.

The relay control section 701 has a function of controlling a transmission timing when a forward link signal received from the base station 90 is relayed and a reception timing when a reverse link signal received from the radio relay station 110 of the HAPS 10 is relayed.

For example, the relay control section 701 controls the forward link signal (downlink signal) received from the base station 90 to be transmitted to the HAPS 10 at a transmission timing shifted by the offset that is set in accordance with the transmission delay time and the propagation delay time. The radio relay station 110 of the HAPS 10 can prevent a deterioration of communication quality of the forward link signal by receiving a plurality of identical forward link signals that arrive simultaneously from the base station 90 via the GW stations 70(1) to 70(3).

For example, the relay control section 701 controls to receive the reverse link signal (uplink signal) transmitted from the HAPS 10 at a reception timing shifted by an offset that is set in accordance with the transmission delay time and the propagation delay time. The base station 90 can prevent the deterioration of communication quality of the reverse link signal by receiving a plurality of identical reverse link signals that arrive simultaneously from the terminal apparatus via the radio relay station 110 of the HAPS 10 and the GW stations 70(1) to 70(3).

Figure 17:
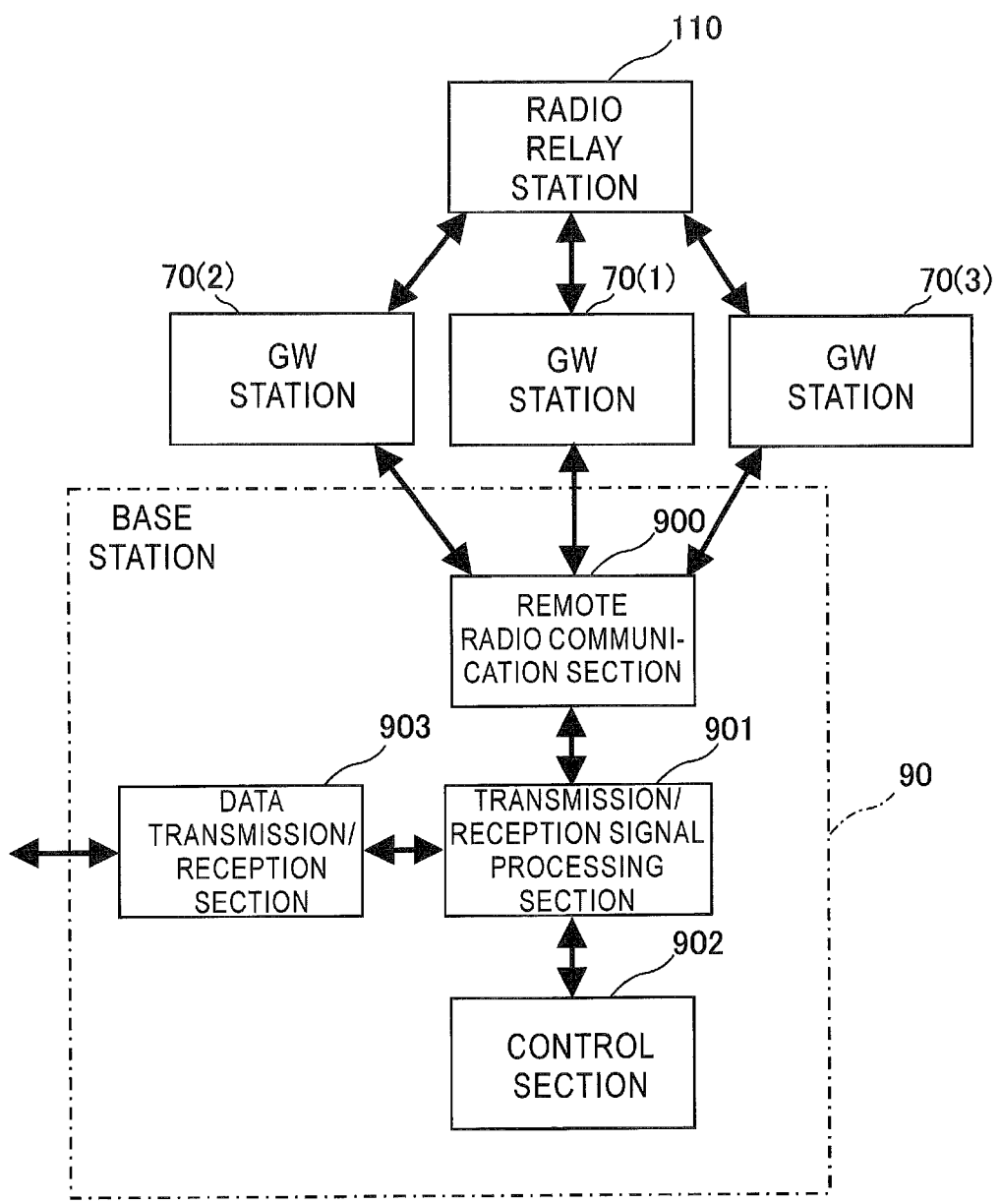
FIG. 17 is a block diagram showing a configuration example of a main section of a base station in a communication system according to the embodiment.

FIG. 17 is a block diagram showing a configuration example of a main section of the base station 90 in a communication system according to the embodiment. In FIG. 17, the base station 90 includes a remote radio communication section 900, a transmission/reception signal processing section 901, a control section 902, and a data transmission/reception section 903. The remote radio communication section 900 communicates with the plurality of GW stations 70(1) to 70(3) via the optical extension lines. The transmission/reception signal processing section 901 generates a forward link signal by modulating a transmission data based on a predetermined radio transmission system (for example, radio transmission system defined by 3GPP LTE, LTE-Advanced, 5G, etc.), or generates a reception data by demodulating a reception signal. The data transmission/reception section 903 receives various data to be transmitted from a core network of the mobile communication or the like, and transmits various data received via the GW stations 70(1) to 70(3) to the core network of the mobile communication or the like The control section 902 controls a generation/transmission of the forward link signal, a reception of the reverse link signal, a generation of the reception data, and the like by the transmission/reception signal processing section 901. In the present embodiment, the control section 902 controls to transmit the generated identical forward link signal to each of the GW stations 70(1) to 70(3) at a transmission timing shifted by an offset that is set in accordance with a transmission delay time between the own base station and each of the GW stations 70(1) to 70(3) and a propagation delay time (propagation delay time in accordance with a distance between each GW station and the HAPS) of a radio section of each feeder link, or controls to receive a reverse link signal transmitted from the HAPS 10 via the GW stations 70(1) to 70(3) and shift the reverse link signal by the foregoing offset.

The radio relay station 110 of the HAPS 10 can prevent the deterioration of communication quality of the forward link signal by receiving a plurality of identical forward link signals that arrive simultaneously from the base station 90 via the GW stations 70(1) to 70(3). Further, the base station 90 can prevent the deterioration of communication quality of the reverse link signal by receiving a plurality of identical reverse link signals simultaneously from the radio relay station 110 of the HAPS 10 via the GW stations 70(1) to 70(3).

Figure 18:
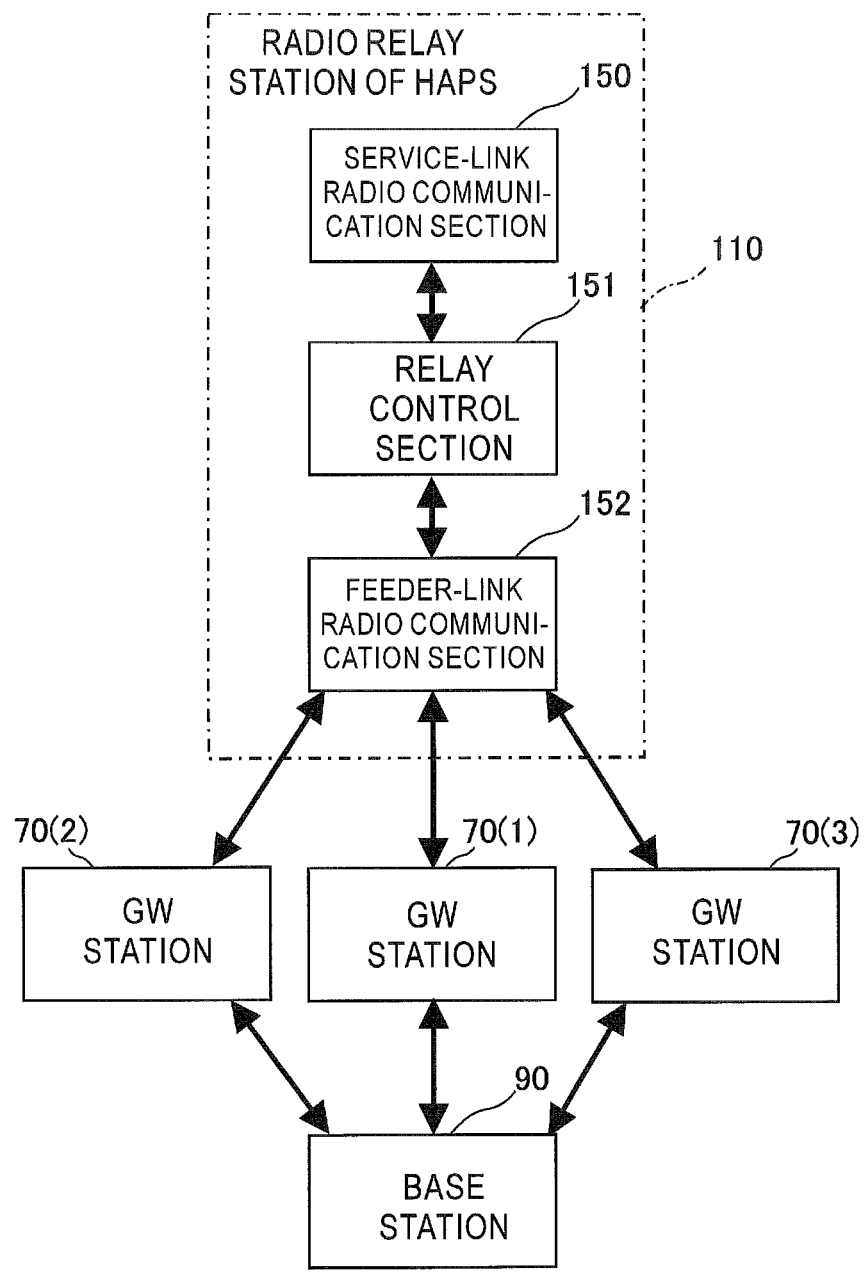
FIG. 18 is a block diagram showing a configuration example of a main section of a radio relay station of HAPS in a communication system according to the embodiment.

FIG. 18 is a block diagram showing a configuration example of a main section of the radio relay station 110 of the HAPS 10 in a communication system according to the embodiment. In FIG. 18, the radio relay station 110 functions as a slave repeater, and includes a service-link radio communication section 150, a relay control section 151, and a feeder-link radio communication section 152. The service-link radio communication section 150 includes, for example, an antenna, a high frequency amplifier, and the like, and wirelessly communicates with the terminal apparatus via the service link. The feeder-link radio communication section 152 includes, for example, an antenna, a high frequency amplifier, a frequency converter, and the like, and wirelessly communicates with the plurality of GW stations 70(1) to 70(3) via a radio section of the feeder link.

It is noted that, the process steps and configuration elements of the communication relay apparatus such as HAPSs 10 and 20, the feeder station, the remote control apparatus, the server, the terminal apparatus (user apparatus, mobile station, communication terminal) and the base station apparatus in the base station described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, radio relay station, feeder station, base station, base station apparatus, radio relay apparatus, terminal apparatus (user apparatus, mobile station, communication terminal), remote control apparatus, server, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, an electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-temporary recording medium. The code of the program may be read and executed by a computer, a processor, another device or an apparatus machine, and the format is not limited to a specific format. For example, the program code may be any of source code, object code, and binary code, or may be a mixture of two or more of these codes.

The description of embodiments disclosed in the present specification is provided so that the present disclosures can be produced or used by those skilled in the art. Various modifications of the present disclosures will be readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

10 HAPS (solar plane type)
20 HAPS (airship type)
40 cell-formation target airspace
41, 42, 43 three-dimensional cell
45 cloud
46 rainfall
50 airspace where a HAPS is located
60 drone
61 terminal apparatus
61(1), 61(2) terminal apparatus
65 airplane
70 gateway station (GW station)
70(1) first gateway station (first GW station)
70(2) second gateway station (second GW station)
70(3) third gateway station (third GW station)
72 artificial satellite
80 mobile communication network
85 remote control apparatus (control center)
86 server
90 base station (eNodeB)
91(1) to 91(3) optical extension line
100, 200, 300 beam
100A, 100A(1), 100A(2) cell
110, 210 radio relay station
150 service-link radio communication section
151 relay control section
152 feeder-link radio communication section
700 feeder-link radio communication section
701 relay control section
702 remote radio communication section
900 remote radio communication section
901 transmission/reception signal processing section
902 control section
903 data transmission/reception section

The invention claimed is:

1. A communication system for performing a communication via a radio relay apparatus located in an upper airspace,
wherein a plurality of gateway stations for forming radio sections of a plurality of feeder links with the radio relay apparatus are disposed at a plurality of locations geographically separated from each other on the ground or on the sea,
wherein the communication system comprises a base station connected to the plurality of gateway stations,
wherein the communication system comprises a management apparatus for managing current position information of each of the radio relay apparatus, the gateway stations and the base station,
wherein, in each of the plurality of forward links for transmitting a signal to the radio relay apparatus via the plurality of gateway stations, each of the plurality of gateway stations:
calculates an offset according to both delay times of a transmission delay time between the base station and the gateway station and a propagation delay time between the gateway station and the radio relay apparatus, based on the current position information of each of the radio relay apparatus, the gateway stations and the base station which is acquired from the management apparatus; and
shifts a transmission timing of the signal by the calculated offset.

2. A communication system for performing a communication via a radio relay apparatus located in an upper airspace,
wherein a plurality of gateway stations for forming radio sections of a plurality of feeder links with the radio relay apparatus are disposed at a plurality of locations geographically separated from each other on the ground or on the sea,
wherein the communication system comprises a base station connected to the plurality of gateway stations,
wherein the communication system comprises a management apparatus for managing current position information of each of the radio relay apparatus, the gateway stations and the base station,
wherein, in each of the plurality of forward links for transmitting a signal to the radio relay apparatus via the plurality of gateway stations, the base station:
calculates an offset according to both delay times of a transmission delay time between the base station and the gateway station and a propagation delay time between the gateway station and the radio relay apparatus, based on the current position information of each of the radio relay apparatus, the gateway stations and the base station which is acquired from the management apparatus; and
shifts a transmission timing of the signal by the calculated offset.

3. A communication system for performing a communication via a radio relay apparatus located in an upper airspace,
wherein a plurality of gateway stations for forming radio sections of a plurality of feeder links with the radio relay apparatus are disposed at a plurality of locations geographically separated from each other on the ground or on the sea,
wherein the communication system comprise a base station connected to the plurality of gateway stations,
wherein the communication system comprises a management apparatus for managing current position information of each of the radio relay apparatus, the gateway stations and the base station,
wherein, in each of the plurality of forward links for transmitting a signal to the radio relay apparatus via the plurality of gateway stations, each of the plurality of gateway stations:
calculates an offset according to a propagation delay time between the gateway station and the radio relay apparatus, based on the current position information of each of the radio relay apparatus, the gateway stations and the base station which is acquired from the management apparatus; and
shifts a transmission timing of the signal by the calculated offset, and
wherein, in each of the plurality of forward links, the base station:
calculates an offset according to a transmission delay time between the base station and the gateway station, based on the current position information of each of the radio relay apparatus, the gateway stations and the base station which is acquired from the management apparatus; and
shifts a transmission timing of the signal by the calculated offset.

4. The communication system according to claim 1,
wherein, in each of a plurality of reverse links for receiving a signal from the radio relay apparatus via the plurality of gateway stations, the base station:
calculates an offset according to both delay times of a transmission delay time between the base station and the gateway station and a propagation delay time between the gateway station and the radio relay apparatus, based on the current position information of each of the radio relay apparatus, the gateway stations and the base station which is acquired from a management apparatus; and
shifts a reception timing of the signal by the calculated offset.

5. The communication system according to claim 1,
wherein, in each of the plurality of reverse links for receiving a signal from the radio relay apparatus, each of the plurality of gateway stations:
calculates an offset according to both delay times of a transmission delay time between the base station and the gateway station and a propagation delay time between the gateway station and the radio relay apparatus, based on the current position information of each of the radio relay apparatus, the gateway stations and the base station which is acquired from a management apparatus; and
shifts a reception timing of the signal by the calculated offset.

6. The communication system according to claim 1,
wherein, in each of the plurality of reverse links for receiving a signal from the radio relay apparatus, each of the plurality of gateway stations:
calculates an offset according to a propagation delay time between the gateway station and the radio relay apparatus, based on the current position information of each of the radio relay apparatus and the gateway stations which is acquired from a management apparatus; and
shifts a reception timing of the signal by the calculated offset, and wherein, in each of the plurality of reverse links, the base station:
  calculates an offset according to a transmission delay time between the base station and the gateway station, based on the current position information of each of the gateway stations and the base station which is acquired from the management apparatus; and
  shifts a reception timing of the signal by the calculated offset.

7. A method of operating a gateway station that is one of a plurality of gateway stations disposed at a plurality of locations geographically separated from each other on a ground or on a sea so as to form a radio section of a feeder link between the gateway station and a radio relay apparatus located in an upper airspace,
  the gateway station performing simultaneous transmissions/receptions of signals in cooperation with other gateway stations other than the own station among the plurality of gateway stations, or transmissions/receptions of signals accompanied by a switching with the other gateway stations, with the radio relay apparatus,
  in a forward link for transmitting a signal to the radio relay apparatus or in a reverse link for receiving a signal from the radio relay apparatus, the gateway station:
    calculating an offset according to both delay times of a transmission delay time between the base station and the own gateway station and a propagation delay time between the own gateway station and the radio relay apparatus, based on the current position information of each of the radio relay apparatus, the own gateway station and the base station connected to the own gateway station which is acquired from a management apparatus; and
    shifting a transmission timing of the signal of the forward link or a reception timing of the signal of the reverse link by the calculated offset.

8. A method of operating a base station connected to a plurality of gateway stations, the plurality of gateway stations being disposed at a plurality of locations geographically separated from each other on the ground or on the sea so as to form radio sections of a plurality of feeder links between the gateway stations and a radio relay apparatus located in an upper airspace,
  the base station performing simultaneous transmissions/receptions of signals via the plurality of feeder links or transmissions/receptions of signals accompanied by a switching of the feeder links, with the radio relay apparatus, and
  in each of a plurality of forward links for transmitting signals to the radio relay apparatus via the plurality of gateway stations or in each of a plurality of reverse links for receiving signals from the radio relay apparatus via the plurality of gateway stations, the base station:
    calculating an offset according to both delay times of a transmission delay time between the own base station and the gateway station and a propagation delay time between the gateway station and the radio relay apparatus, based on the current position information of each of the radio relay apparatus, the gateway stations and the own base station which is acquired from a management apparatus; and
    shifting a transmission timing of the signal of the forward link or a reception timing of the signal of the reverse link by the calculated offset.

9. The communication system according to claim 1, wherein the forward link having longest delay times for the both delay times among the plurality of forward links is used as a reference forward link, the offset corresponding to the reference forward link is set to zero, and the offsets corresponding to other forward links are calculated.

10. The communication system according to claim 2, wherein the forward link having longest delay times for the both delay times among the plurality of forward links is used as a reference forward link, the offset corresponding to the reference forward link is set to zero, and the offsets corresponding to other forward links are calculated.

11. The communication system according to claim 3, wherein the forward link having a longest propagation delay time among the plurality of forward links is used as a reference forward link, the offset corresponding to the reference forward link is set to zero, and the offsets corresponding to other forward links is calculated, and
wherein the forward link having a longest transmission delay time among the plurality of forward links is used as a reference forward link, the offset corresponding to the reference forward link is set to zero, and the offsets corresponding to other forward links are calculated.

12. The communication system according to claim 2, wherein, in each of a plurality of reverse links for receiving a signal from the radio relay apparatus via the plurality of gateway stations, the base station:
  calculates an offset according to both delay times of a transmission delay time between the base station and the gateway station and a propagation delay time between the gateway station and the radio relay apparatus, based on the current position information of each of the radio relay apparatus, the gateway stations and the base station which is acquired from a management apparatus; and
  shifts a reception timing of the signal by the calculated offset.

13. The communication system according to claim 3, wherein, in each of a plurality of reverse links for receiving a signal from the radio relay apparatus via the plurality of gateway stations, the base station:
  calculates an offset according to both delay times of a transmission delay time between the base station and the gateway station and a propagation delay time between the gateway station and the radio relay apparatus, based on the current position information of each of the radio relay apparatus, the gateway stations and the base station which is acquired from a management apparatus; and
  shifts a reception timing of the signal by the calculated offset.

14. The communication system according to claim 2, wherein, in each of the plurality of reverse links for receiving a signal from the radio relay apparatus, each of the plurality of gateway stations:
  calculates an offset according to both delay times of a transmission delay time between the base station and the gateway station and a propagation delay time between the gateway station and the radio relay apparatus, based on the current position information of each of the radio relay apparatus, the gateway stations and the base station which is acquired from a management apparatus; and
  shifts a reception timing of the signal by the calculated offset.

15. The communication system according to claim 3,
wherein, in each of the plurality of reverse links for receiving a signal from the radio relay apparatus, each of the plurality of gateway stations:
  calculates an offset according to both delay times of a transmission delay time between the base station and the gateway station and a propagation delay time between the gateway station and the radio relay apparatus, based on the current position information of each of the radio relay apparatus, the gateway stations and the base station which is acquired from a management apparatus; and
  shifts a reception timing of the signal by the calculated offset.

16. The communication system according to claim 4,
wherein the reverse link having longest delay times for the both delay times among the plurality of reverse links is used as a reference reverse link, the offset corresponding to the reference reverse link is set to zero, and the offsets corresponding to other reverse links are calculated.

17. The communication system according to claim 12,
wherein the reverse link having longest delay times for the both delay times among the plurality of reverse links is used as a reference reverse link, the offset corresponding to the reference reverse link is set to zero, and the offsets corresponding to other reverse links are calculated.

18. The communication system according to claim 13,
wherein the reverse link having longest delay times for the both delay times among the plurality of reverse links is used as a reference reverse link, the offset corresponding to the reference reverse link is set to zero, and the offsets corresponding to other reverse links are calculated.

19. The communication system according to claim 5,
wherein the reverse link having longest delay times for the both delay times among the plurality of reverse links is used as a reference reverse link, the offset corresponding to the reference reverse link is set to zero, and the offsets corresponding to other reverse links are calculated.

20. The communication system according to claim 14,
wherein the reverse link having longest delay times for the both delay times among the plurality of reverse links is used as a reference reverse link, the offset corresponding to the reference reverse link is set to zero, and the offsets corresponding to other reverse links are calculated.

21. The communication system according to claim 15,
wherein the reverse link having longest delay times for the both delay times among the plurality of reverse links is used as a reference reverse link, the offset corresponding to the reference reverse link is set to zero, and the offsets corresponding to other reverse links are calculated.

22. The communication system according to claim 2,
wherein, in each of the plurality of reverse links for receiving a signal from the radio relay apparatus, each of the plurality of gateway stations:
  calculates an offset according to a propagation delay time between the gateway station and the radio relay apparatus, based on the current position information of each of the radio relay apparatus and the gateway stations which is acquired from a management apparatus; and
  shifts a reception timing of the signal by the calculated offset, and
wherein, in each of the plurality of reverse links, the base station:
  calculates an offset according to a transmission delay time between the base station and the gateway station, based on the current position information of each of the gateway stations and the base station which is acquired from the management apparatus; and
  shifts a reception timing of the signal by the calculated offset.

23. The communication system according to claim 3,
wherein, in each of the plurality of reverse links for receiving a signal from the radio relay apparatus, each of the plurality of gateway stations:
  calculates an offset according to a propagation delay time between the gateway station and the radio relay apparatus, based on the current position information of each of the radio relay apparatus and the gateway stations which is acquired from a management apparatus; and
  shifts a reception timing of the signal by the calculated offset, and
wherein, in each of the plurality of reverse links, the base station:
  calculates an offset according to a transmission delay time between the base station and the gateway station, based on the current position information of each of the gateway stations and the base station which is acquired from the management apparatus; and
  shifts a reception timing of the signal by the calculated offset.

24. The communication system according to claim 6,
wherein the base station uses the reverse link having a longest propagation delay time among the plurality of reverse links as a reference reverse link, sets the offset corresponding to the reference reverse link is set to zero, and calculates the offsets corresponding to the other reverse links, and
wherein each of the plurality of gateway stations uses the reverse link having a longest transmission delay time among the plurality of reverse links as a reference reverse link, sets the offset corresponding to the reference reverse link to zero, and calculates the offsets corresponding to the other reverse links.

25. The communication system according to claim 22,
wherein the base station uses the reverse link having a longest propagation delay time among the plurality of reverse links as a reference reverse link, sets the offset corresponding to the reference reverse link is set to zero, and calculates the offsets corresponding to the other reverse links, and
wherein each of the plurality of gateway stations uses the reverse link having a longest transmission delay time among the plurality of reverse links as a reference reverse link, sets the offset corresponding to the reference reverse link to zero, and calculates the offsets corresponding to the other reverse links.

26. The communication system according to claim 23,
wherein the base station uses the reverse link having a longest propagation delay time among the plurality of reverse links as a reference reverse link, sets the offset corresponding to the reference reverse link is set to zero, and calculates the offsets corresponding to the other reverse links, and wherein each of the plurality of gateway stations uses the reverse link having a longest transmission delay time among the plurality of reverse links as a reference reverse link, sets the offset corresponding to the reference reverse link to zero, and calculates the offsets corresponding to the other reverse links.

27. The method of operating a gateway station according to claim 7, wherein the forward link having longest delay times for the both delay times among the plurality of forward links is used as a reference forward link, the offset corresponding to the reference forward link is set to zero, and the offsets corresponding to other forward links are calculated, and wherein the reverse link having longest delay times for the both delay times among the plurality of reverse links is used as a reference reverse link, the offset corresponding to the reference reverse link is set to zero, and the offsets corresponding to other reverse links are calculated.

28. The method of operating a base station according to claim 8, wherein the forward link having longest delay times for the both delay times among the plurality of forward links is used as a reference forward link, the offset corresponding to the reference forward link is set to zero, and the offsets corresponding to other forward links are calculated, and wherein the reverse link having longest delay times for the both delay times among the plurality of reverse links is used as a reference reverse link, the offset corresponding to the reference reverse link is set to zero, and the offsets corresponding to other reverse links are calculated.

\* \* \* \* \*